(12) United States Patent
Ji et al.

(10) Patent No.: US 12,105,962 B2
(45) Date of Patent: Oct. 1, 2024

(54) STORAGE DEVICE AND METHOD FOR USING REFERENCE COUNT TO PROGRAM NONVOLATILE MEMORY

(71) Applicant: SAMSUNG ELECTRONICS CO., LTD., Suwon-si (KR)

(72) Inventors: Sooyoung Ji, Seoul (KR); Euiseong Seo, Suwon-si (KR); Jaeyong Bae, Daejeon (KR); Yuhun Jun, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 116 days.

(21) Appl. No.: 17/891,495

(22) Filed: Aug. 19, 2022

(65) Prior Publication Data

US 2023/0214123 A1    Jul. 6, 2023

(30) Foreign Application Priority Data

Jan. 6, 2022    (KR) .................. 10-2022-0001907

(51) Int. Cl.
*G06F 3/06*         (2006.01)
(52) U.S. Cl.
CPC .......... *G06F 3/0613* (2013.01); *G06F 3/0641* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 8,874,994 B2 | 10/2014 | Sharon et al. |
| 9,223,511 B2 | 12/2015 | Rudelic |
| 9,430,639 B2 | 8/2016 | Seo et al. |
| 9,841,918 B2 | 12/2017 | Erez et al. |
| 10,545,864 B2 | 1/2020 | Kanno et al. |

(Continued)

FOREIGN PATENT DOCUMENTS

| | | |
|---|---|---|
| KR | 10-2018-0058169 | 5/2018 |
| KR | 10-2140792 | 8/2020 |
| KR | 10-2021-0078548 | 6/2021 |

*Primary Examiner* — Charles Rones
*Assistant Examiner* — Ryan Dare
(74) *Attorney, Agent, or Firm* — F. CHAU & ASSOCIATES, LLC

(57) ABSTRACT

A storage device including: a memory storing data based on program modes; and a storage controller including a program mode table, the storage controller configured to: in response to a program request and first data being already stored in the memory, perform a deduplication operation in which the first data is logically and not physically programmed, in response to the program or an erase request, update a count value from a first to a second value, and in response to a determination that a first program mode corresponding to the first value and a second program mode corresponding to the second value are different, transmit a first command and address to the memory such that a first program operation in which the first data programmed with first bits corresponding to the first program mode is re-programmed with second bits corresponding to the second program mode is performed.

20 Claims, 13 Drawing Sheets

(56) References Cited

U.S. PATENT DOCUMENTS

| | | | |
|---|---|---|---|
| 2018/0143780 A1* | 5/2018 | Cho | G06F 16/134 |
| 2019/0294345 A1 | 9/2019 | Yu et al. | |
| 2020/0310659 A1 | 10/2020 | Kannan | |
| 2022/0171676 A1* | 6/2022 | Hwang | G06F 11/1068 |
| 2022/0237148 A1* | 7/2022 | Perlman | G06F 16/176 |
| 2022/0405200 A1* | 12/2022 | Karr | G06F 3/067 |

* cited by examiner

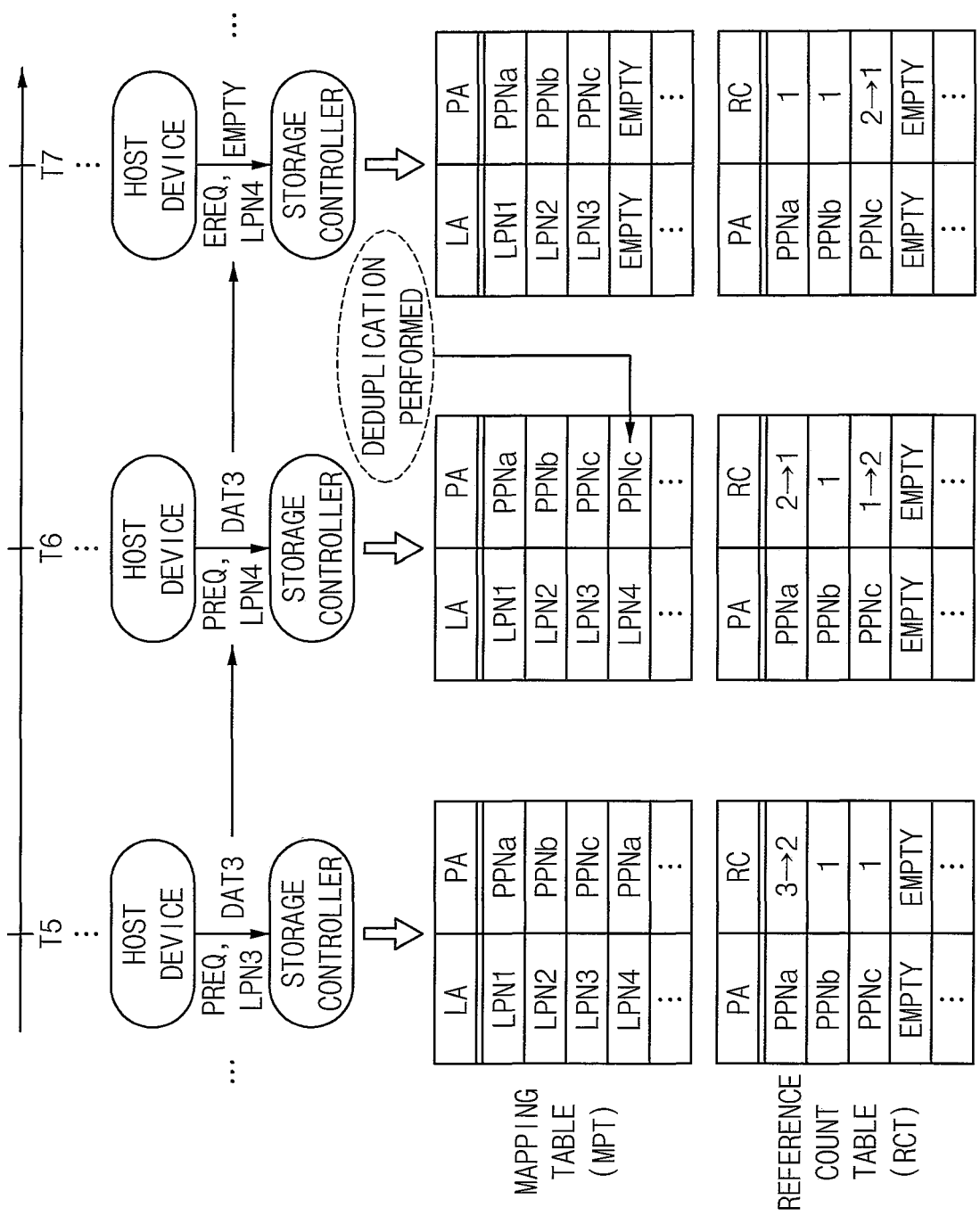

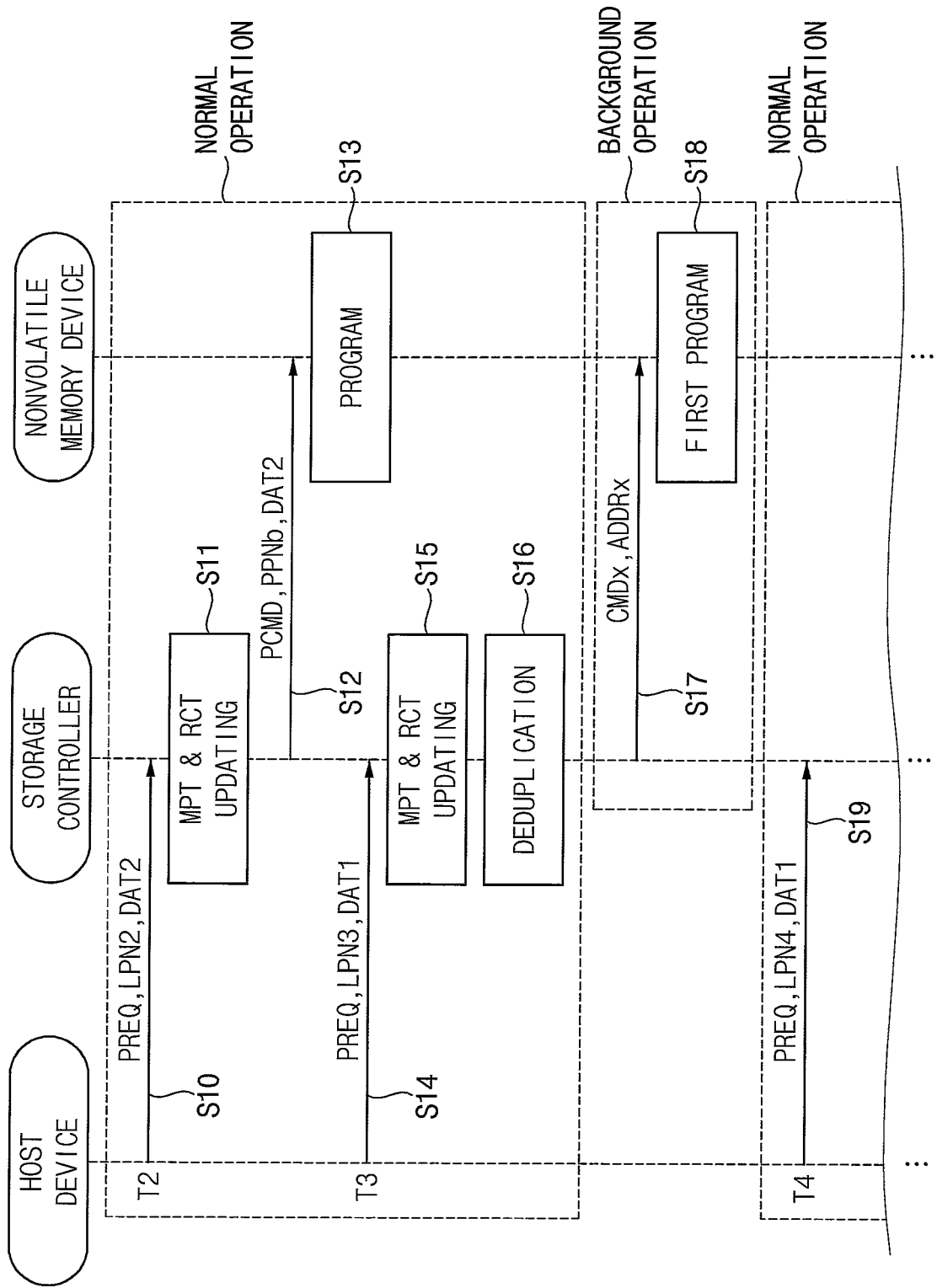

TARGET PROGRAM MODE TABLE (TPMT)

| TIER | REFERENCE COUNT (RC) | TARGET PROGRAM MODE (TPM) |
|---|---|---|
| 1 | ≥4 | pSLC_PGM_MODE |
| 2 | 2,3 | pMLC_PGM_MODE |
| 3 | ≤1 | QLC_PGM_MODE |

FIG. 10

TARGET PROGRAM MODE TABLE (TPMT)

| TIER | REFERENCE COUNT (RC) | TARGET PROGRAM MODE (TPM) |
|---|---|---|
| 1 | ≥4 | pSLC_PGM_MODE |
| 2 | 3 | pMLC_PGM_MODE |
| 3 | 2 | pTLC_PGM_MODE |
| 4 | ≤1 | QLC_PGM_MODE |

STORAGE DEVICE AND METHOD FOR USING REFERENCE COUNT TO PROGRAM NONVOLATILE MEMORY

CROSS-REFERENCE TO RELATED APPLICATION

This application claims priority under 35 U.S.C. § 119 to Korean Patent Application No. 10-2022-0001907 filed on Jan. 6, 2022 in the Korean Intellectual Property Office (KIPO), the disclosure of which is incorporated by reference herein in its entirety.

1. TECHNICAL FIELD

Example embodiments of the present disclosure relate generally to semiconductor integrated circuits, and more particularly to storage devices and methods of operating the storage devices.

2. DESCRIPTION OF THE RELATED ART

Recently, a storage device including a nonvolatile memory device, such as a solid state drive (SSD), has been widely used. The SSD uses integrated circuit assemblies to store data persistently, typically using a flash memory and may function as secondary storage in the hierarchy of computer storage. In comparison to other memory devices, the nonvolatile memory device may have a higher access speed to programmed data, greater stability and durability, and/or low power consumption, but may have a limited number of program/erase operations (e.g., program/erase (P/E) cycles).

When the same data is duplicately programmed in the nonvolatile memory device, a deduplication operation in which duplicated data is only logically programmed but not physically programmed may be performed. As a result of the deduplication, the limitation of the P/E cycles may be reduced, and the program performance of the nonvolatile memory device may be improved.

However, as the deduplication is performed, data fragmentation may occur. The data fragmentation may refer to the case where the duplicated data is programmed in separate chips of the nonvolatile memory devices discontinuously. In other words, logically continuous data may be scattered across many chip locations. The data fragmentation may cause the read performance of the nonvolatile memory device to degrade.

SUMMARY

At least one example embodiment of the present disclosure provides a storage device capable of efficiently improving the read performance of data without increasing a storage space occupied by the data in a nonvolatile memory device.

At least one example embodiment of the present disclosure provides a method of operating the storage device.

According to example embodiments of the present disclosure, a storage device includes: a nonvolatile memory device configured to store data based on program modes for programming data with a preset number of bits; and a storage controller including a target program mode table including a relationship between a reference count value and the program modes, the reference count value representing a number of times data is duplicated, wherein the storage controller is configured to: in response to a program request being received from a host device, and in response to first data corresponding to the program request being already stored in the nonvolatile memory device, perform a deduplication operation in which the first data is logically programmed and not physically programmed, in response to the program request or an erase request associated with the first data being received from the host device, update a first reference count value from a first value to a second value, the first reference count value representing a number of times the first data is duplicated, and in response to a determination based on information in the target program mode table that a first program mode corresponding to the first value and a second program mode corresponding to the second value are different, transmit a first command and a first address to the nonvolatile memory device such that a first program operation in which the first data programmed with a first number of bits corresponding to the first program mode is re-programmed with a second number of bits corresponding to the second program mode is performed.

According to example embodiments of the present disclosure, there is provided a method of operating a storage device including a nonvolatile memory device, the method including: in response to a program request being received from a host device, and in response to first data corresponding to the program request being already stored in the nonvolatile memory device, performing a deduplication operation in which the first data is logically programmed and not physically programmed; in response to the program request or an erase request associated with the first data being received from the host device, updating a first reference count value from a first value to a second value, the first reference count value representing a number of times the first data is duplicated; and in response to a determination based on information in a target program mode table that a first program mode corresponding to the first value and a second program mode corresponding to the second value are different, performing a first program operation in which the first data programmed with a first number of bits corresponding to the first program mode is re-programmed with a second number of bits corresponding to the second program mode.

According to example embodiments of the present disclosure, a storage device includes: a nonvolatile memory device configured to store data based on program modes for programming data with a preset number of bits; and a storage controller including a target program mode table including a relationship between a reference count value and the program modes, the reference count value representing a number of times data is duplicated, wherein the storage controller is configured to: in response to a program request being received from a host device, and when first data corresponding to the program request is already stored in the nonvolatile memory device, perform a deduplication operation in which the first data is logically programmed and not physically programmed, in response to the program request or an erase request associated with the first data being received from the host device, update a first reference count value from a first value to a second value, the first reference count value representing a number of times the first data is duplicated, in response to determination based on information in the target program mode table that a first program mode corresponding to the first value and a second program mode corresponding to the second value are different, transmit a first command and a first address to the nonvolatile memory device such that a first program operation in which the first data programmed with a first number of bits corresponding to the first program mode is re-programmed with a second number of bits corresponding to the second program mode is performed, before the first program operation is performed, set at least one of a plurality of free blocks of the nonvolatile memory device as an open block, in response to the program request being received, and in response to the deduplication operation being performed on the first data, increase the first reference count value, and in response to the second value being greater than the first value, and when the second program mode and the first program mode are different, perform the first program operation on the open block.

In the storage device and the method of operating the storage device according to example embodiments of the present disclosure, the first program operation in which the first data programmed with the first number of bits corresponding to the first program mode is re-programmed with the second number of bits corresponding to the second program mode may be performed based on the number of times the first data is duplicated and the target program mode table. Accordingly, the storage device may have the improved read performance for the first data without increasing the size of the storage space occupied by the first data in the nonvolatile memory device.

BRIEF DESCRIPTION OF THE DRAWINGS

Illustrative, non-limiting example embodiments of the present disclosure will be more clearly understood from the following detailed description taken in conjunction with the accompanying drawings.

FIGS. 4A and 4B are diagrams for describing operations of updating a mapping table and a reference count table in FIG. 1.

FIG. 5 is a diagram for describing a first program operation performed based on a target program mode table in FIG. 1.

FIG. 10 is a diagram illustrating an example of a target program mode table in FIG. 1.

DETAILED DESCRIPTION OF THE EMBODIMENTS

Figure 1:
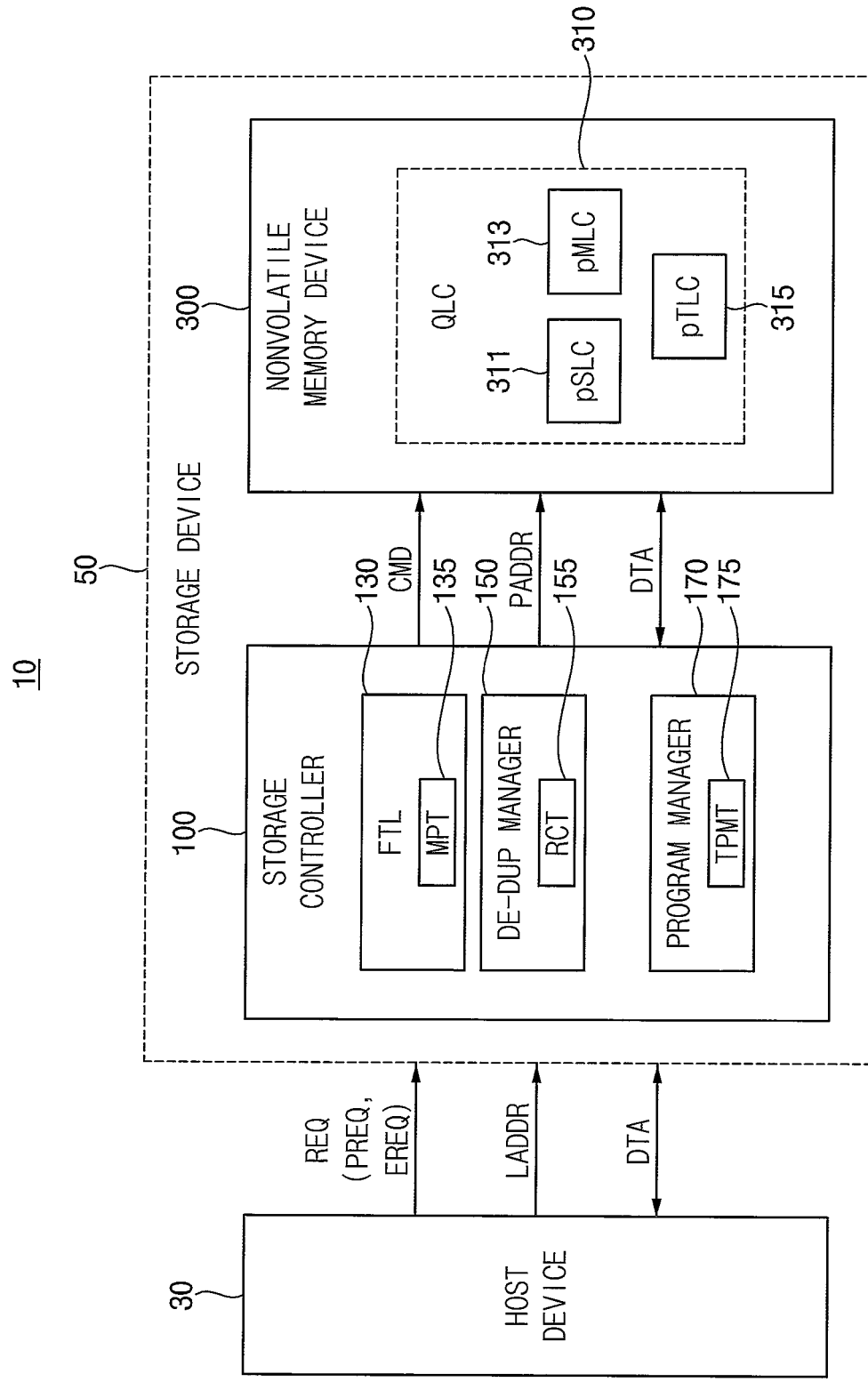
FIG. 1 is a block diagram illustrating a storage device and an electronic device including the storage device according to example embodiments of the present disclosure.

Various example embodiments of the present disclosure will be described more fully with reference to the accompanying drawings. The present disclosure may, however, be embodied in many different forms and should not be construed as limited to the embodiments set forth herein. Like reference numerals may refer to like elements throughout this application.

FIG. 1 is a block diagram illustrating a storage device and an electronic device including the storage device according to example embodiments of the present disclosure.

Referring to FIG. 1, an electronic device 10 includes a host device 30 and a storage device 50.

The host device 30 controls overall operations of the electronic device 10.

In some example embodiments, the host device 30 may include a host processor and a host memory. The host processor may control an operation of the host device 30. For example, the host processor may execute an operating system (OS). For example, the operating system may include a file system for file management and a device driver for controlling peripheral devices including the storage device 50 at the operating system level. The host memory may store instructions and/or data that are executed and/or processed by the host processor.

In some example embodiments, the host device 30 may transmit a request REQ to the storage device 50, and may transmit a logical address LADDR and data DTA that correspond to the request REQ to the storage device 50. For example, the host device 30 may transmit a program request PREQ to the storage device 50, and may transmit a logical address and data that correspond to the program request PREQ to the storage device 50. For example, the host device 30 may transmit a read (or retrieve) request or an erase request EREQ to the storage device 50, and may transmit a logical address that corresponds to the read request or the erase request EREQ to the storage device 50.

The storage device 50 includes a storage controller 100 and a nonvolatile memory device 300. The storage controller 100 controls the nonvolatile memory device 300 based on the request REQ, the logical address LADDR and the data DTA that are received from the host device 30.

In some example embodiments, the nonvolatile memory device 300 may include a plurality of dies, and each of the plurality of dies may include a plurality of blocks. A storage region 310 in the nonvolatile memory device 300 may be formed by the plurality of blocks, and the plurality of blocks may include a plurality of memory cells each of which stores data with a preset (or predetermined) number of bits. For example, each of the plurality of memory cells may store N-bit data, where N is an integer greater than or equal to two.

In some example embodiments, based on program modes, the nonvolatile memory device 300 may store data with the number of bits smaller than N in some of the plurality of memory cells and may store the N-bit data in others of the plurality of memory cells. For example, in the case where the storage region 310 includes first, second and third sub-regions 311, 313 and 315 that are different from each other, the data with the number of bits smaller than N may be stored in memory cells included in the first to third sub-regions 311, 313 and 315, and the N-bit data may be stored in memory cells included in the storage region 310 other than the first to third sub-regions 311, 313 and 315. For example, N may be four, and each of the plurality of memory cells included in the storage region 310 may be a quad (or quadruple) level cell (QLC) in which 4-bit data may be stored. In this example, the nonvolatile memory device 300 may store 1-bit data in each of memory cells included in the first sub-region 311, may store 2-bit data in each of memory cells included in the second sub-region 313, may store 3-bit data in each of memory cells included in the third sub-region 315, and may store 4-bit data in each of memory cells included in the remaining regions of the storage region 310 other than the first to third sub-regions 311, 313 and 315. The program modes and operations related thereto will be described with reference to FIG. 2.

In some example embodiments, the program modes may be operation modes for programming the data with the preset number of bits in the nonvolatile memory device 300. For convenience of description, an example where N is four is illustrated. An operation mode in which N-bit data (e.g., 4-bit data) is programmed in a memory cell capable of storing up to the N-bit data may be referred to as a quad level cell program mode. An operation mode in which 3-bit data smaller than N-bit data (e.g., 4-bit data) is programmed in a memory cell capable of storing up to the N-bit data may be referred to as a pseudo triple level cell (pTLC) program mode. An operation mode in which 2-bit data smaller than N-bit data (e.g., 4-bit data) is programmed in a memory cell capable of storing up to the N-bit data may be referred to as a pseudo multi level cell (pMLC) program mode. An operation mode in which 1-bit data smaller than N-bit data (e.g., 4-bit data) is programmed in a memory cell capable of storing up to the N-bit data may be referred to as a pseudo single level cell (pSLC) program mode.

In some example embodiments, the nonvolatile memory device 300 may include a NAND flash memory. In other example embodiments, the nonvolatile memory device 300 may include an electrically erasable programmable read-only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), and/or the like.

In some example embodiments, the storage device 50 may further include a buffer memory. The buffer memory may store instructions and/or data that are executed and/or processed by the storage controller 100, and may temporarily store data stored in or to be stored into the nonvolatile memory device 300. For example, the buffer memory may include at least one of various volatile memories, e.g., a static random access memory (SRAM), a dynamic random access memory (DRAM) or the like.

The storage device 50 may receive the program request PREQ and the data DTA corresponding to the program request PREQ from the host device 30. In some example embodiments, the program request PREQ may be provided from or fetched from the host device 30.

The storage controller 100 includes a flash translation layer (FTL) 130, a deduplication (DE-DUP) manager 150 and a program manager 170.

In some example embodiments, the flash translation layer 130 and the deduplication manager 150 may be implemented as a hardware module or may be implemented as a software module. When the deduplication manager 150 is implemented as a software module, it may be referred to as a deduplication framework.

In some example embodiments, the flash translation layer 130 may convert the logical address LADDR received from the host device 30 into a physical address PADDR of the nonvolatile memory device 300. The deduplication manager 150 may perform a deduplication operation on the data DTA corresponding to the program request PREQ received from the host device 30. The deduplication operation may be an operation in which the data DTA corresponding to the program request PREQ is logically programmed, but not physically programmed, when the program request PREQ is received or fetched from the host device 30 and when the data DTA corresponding to the program request PREQ is already stored in the nonvolatile memory device 300. In other words, if the data DTA corresponding to the program request PREQ is already stored in the nonvolatile memory device 300, the data DTA is only logically programmed. The program manager 170 may include information associated with or related to the program modes. For the above-described operations, the flash translation layer 130 may include a mapping table (MPT) 135, the deduplication manager 150 may include a reference count table (RCT) 155, and the program manager 170 may include a target program mode table (TPMT) 175.

In some example embodiments, the mapping table 135 may include or represent a relationship between the logical address LADDR and the physical address PADDR. The reference count table 155 may include a reference count value representing the number of times data is duplicated, the number of times data is repeatedly stored, or the number of times data is referenced by the host device 30. The target program mode table 175 may include or represent a relationship between the reference count value and the program modes. The target program mode table 175 will be described with reference to FIGS. 6 and 10.

In some example embodiments, when the program request PREQ is received from the host device 30, and when first data corresponding to the program request PREQ is already stored in the nonvolatile memory device 300, the storage controller 100 may perform a deduplication operation in which the first data is logically programmed without physically programming the first data. When the program request PREQ or the erase request EREQ associated with the first data is received from the host device 30, the storage controller 100 may update a first reference count value from a first value to a second value. The first reference count value may represent the number of times the first data is duplicated. When it is determined based on the target program mode table 175 that a first program mode corresponding to the first value and a second program mode corresponding to the second value are different types of program modes, the storage controller 100 may transmit a command and an address to the nonvolatile memory device 300 such that a first program operation is performed, wherein in the first program operation the first data programmed with a first number of bits corresponding to the first program mode is programmed or re-programmed with a second number of bits corresponding to the second program mode. For example, when the first program mode is one of the program modes (e.g., the quad level cell program mode), and when the second program mode is another of the program modes (e.g., the pseudo single level cell program mode), it may be determined that the first program mode and the second program mode are different types of program modes. An operation of updating the mapping table 135 and the reference count table 155 will be described with reference to FIGS. 4A and 4B. The first program operation will be described with reference to FIG. 7.

In some example embodiments, after the storage controller 100 determines whether to perform the first program operation, all or some of the first to third sub-regions 311, 313 and 315 included in the storage region 310 of the nonvolatile memory device 300 may be set or determined based on the second program mode. For example, when the second program mode is the pseudo single level cell program mode, the first sub-region 311 may be set. When the second program mode is the pseudo multi level cell program mode, the second sub-region 313 may be set. When the second program mode is the pseudo triple level cell program mode, the third sub-region 315 may be set. When the second program mode is the quad level cell program mode, all of the first to third sub-regions 311, 313 and 315 may not be set.

In some example embodiments, the storage device 50 may be a solid state drive (SSD). In other example embodiments, the storage device 50 may be a universal flash storage (UFS), a multi-media card (MMC) or an embedded multi-media card (eMMC). In still other example embodiments, the storage device 50 may be one of a secure digital (SD) card, a micro SD card, a memory stick, a chip card, a universal serial bus (USB) card, a smart card, a compact flash (CF) card, or the like.

In some example embodiments, the storage device 50 may be connected to the host device 30 via a block accessible interface which may include, for example, a UFS, an eMMC, a nonvolatile memory express (NVMe) bus, a serial advanced technology attachment (SATA) bus, a small computer small interface (SCSI) bus, a serial attached SCSI (SAS) bus, or the like. The storage device 50 may use a block accessible address space corresponding to an access size of the nonvolatile memory device 300 to provide the block accessible interface to the host device 30, for allowing the access by units of a block with respect to data stored in the nonvolatile memory device 300.

In some example embodiments, the electronic device 10 may be any computing system, such as a personal computer (PC), a server computer, a data center, a workstation, a digital television, a set-top box, a navigation system, etc. In other example embodiments, the electronic device 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

In the storage device 50 according to example embodiments, the first program operation in which the first data programmed with the first number of bits corresponding to the first program mode is re-programmed with the second number of bits corresponding to the second program mode may be performed based on the number of times the first data is duplicated. The first program operation may be performed based on the target program mode table 175 that includes the relationship between the program modes and the reference count value that represents the number of times the first data is duplicated. The storage device 50 may have improved or enhanced read performance for the first data by performing the first program operation. In addition, if the number of times the first data is duplicated increases, a size of a storage space occupied by the first data on which the first program operation is performed in the nonvolatile memory device 300 may not increase because the deduplication operation in which the first data is physically programmed is done only once in the nonvolatile memory device 300. Accordingly, the storage device 50 may have the improved read performance for the first data without increasing the size of the storage space occupied by the first data in the nonvolatile memory device 300.

Figure 2:
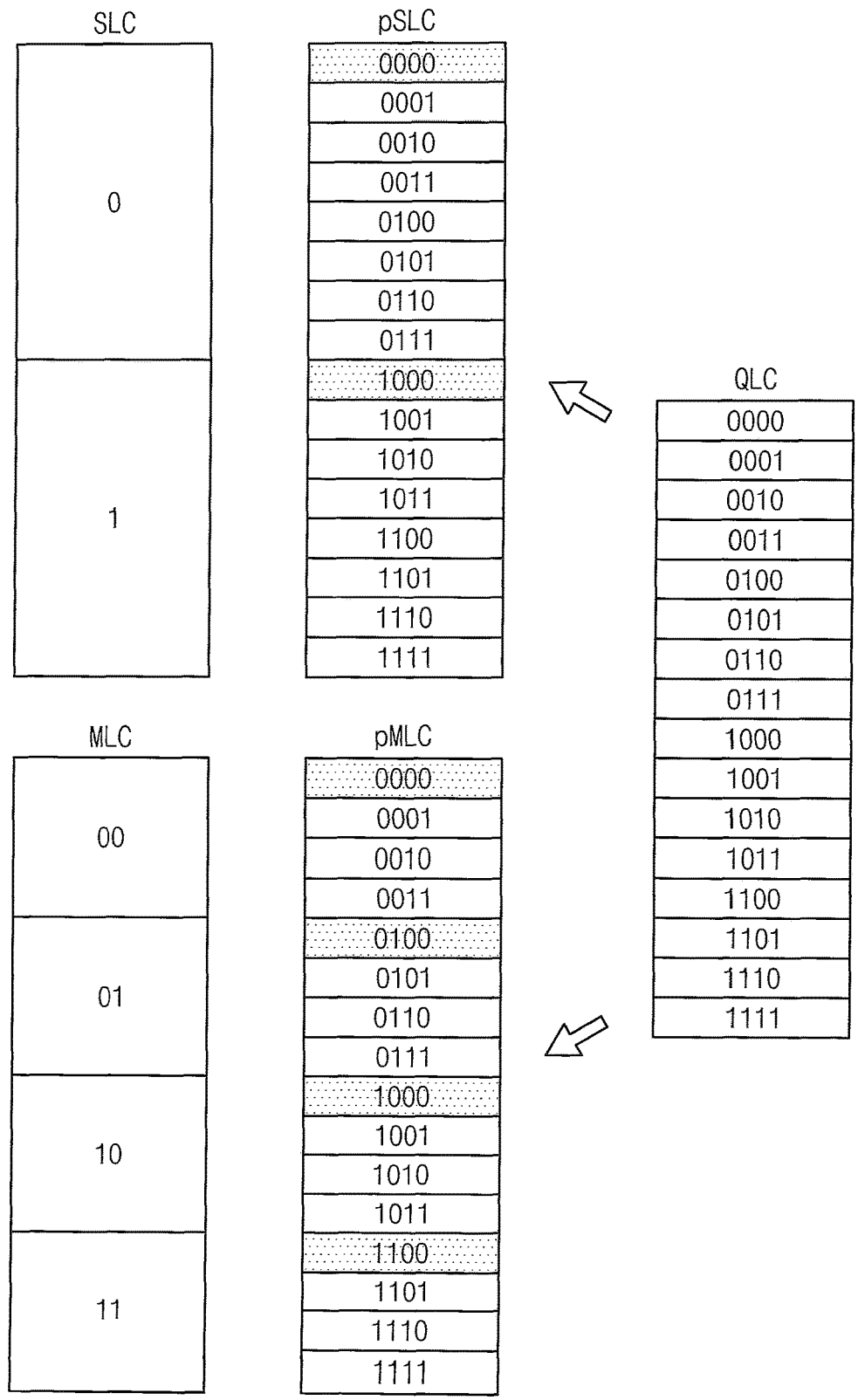
FIG. 2 is a diagram for describing program modes of the storage device of FIG. 1.

FIG. 2 is a diagram for describing program modes of the storage device 50 of FIG. 1.

Referring to FIGS. 1 and 2, one or more of the first to third sub-regions 311, 313 and 315 may be set in all or some of the storage region 310 of the nonvolatile memory device 300 based on the program modes, and the program operation may be performed on the first to third sub-regions 311, 313 and 315.

For example, each of the plurality of memory cells included in the nonvolatile memory device 300 may store N-bit data. For example, when N is four, the plurality of memory cells may be quad level cells. Each of the plurality of memory cells may operate in the quad level cell program mode for storing the N-bit data (e.g., 4-bit data), or may operate in one of the pseudo single level cell program mode, the pseudo multi level cell program mode and the pseudo triple level cell program mode for storing data smaller than the N-bit data.

In some example embodiments, when each memory cell operates in the quad level cell program mode, the memory cell may be programmed into a program state corresponding to one of '0000', '0001', '0010', '0011', '0100', '0101', '0110', '0111', '1000', '1001', '1010', '1011', '1100', '1101', '1110' and '1111', which are 4-bit data.

In some example embodiments, when each memory cell operates in the pseudo single level cell program mode (e.g., pSLC), the memory cell may be programmed similar to a single level cell (SLC), and may be programmed into a program state corresponding to one of '0' and '1', which are 1-bit data. As illustrated by shading in FIG. 2, 4-bit data '0000' and '1000' may be stored as 1-bit data '0' and '1' in the pseudo single level cell program mode (e.g., pSLC), respectively, and thus 1-bit data '0' and '1' in the pseudo single level cell program mode (e.g., pSLC) may correspond to 4-bit data '0000' and '1000' in the quad level cell program mode, respectively.

In some example embodiments, when each memory cell operates in the pseudo multi level cell program mode (e.g., pMLC), the memory cell may be programmed similar to a multi level cell (MLC), and may be programmed into a program state corresponding to one of '00', '01', '10' and '11', which are 2-bit data. As illustrated by shading in FIG. 2, 4-bit data '0000', '0100', '1000' and '1100' may be stored as 2-bit data '00', '01', '10' and '11' in the pseudo multi level cell program mode (e.g., pMLC), respectively, and thus 2-bit data '00', '01', '10' and '11' in the pseudo multi level cell program mode (e.g., pMLC) may correspond to 4-bit data '0000', '0100', '1000' and '1100' in the quad level cell program mode, respectively.

For convenience of illustration, an example where each memory cell operates in the pseudo triple level cell program mode is omitted, however, each memory cell may operate in the pseudo triple level cell program mode in a manner similar to the pseudo single level cell program mode and the pseudo multi level cell program mode. In addition, although examples of the program states in the pseudo single level cell program mode and the pseudo multi level cell program mode are illustrated in FIG. 2, example embodiments are not limited thereto.

Figure 3:
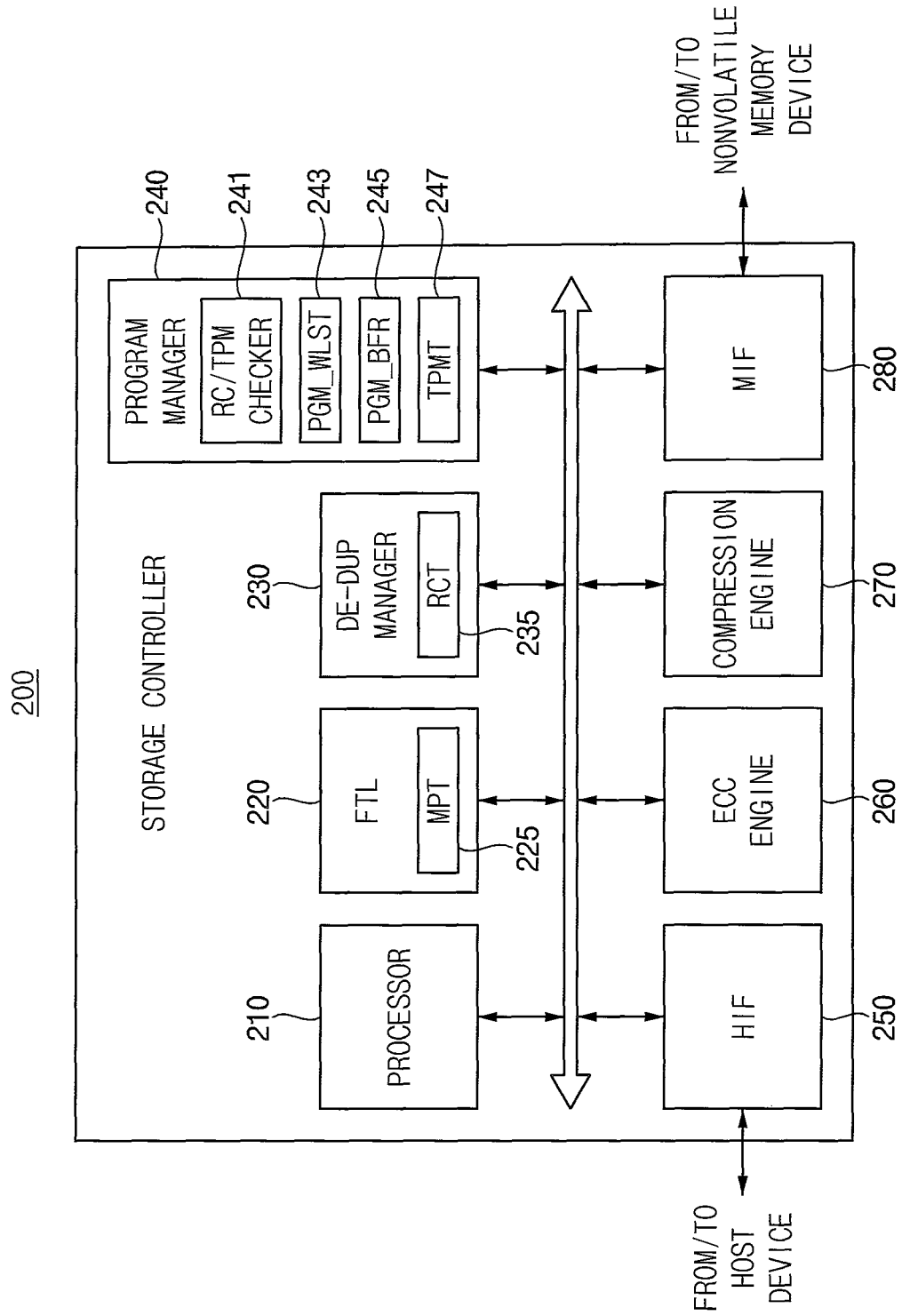
FIG. 3 is a block diagram illustrating an example of a storage controller included in the storage device of FIG. 1.

FIG. 3 is a block diagram illustrating an example of a storage controller included in the storage device 50 of FIG. 1.

Referring to FIG. 3, a storage controller 200 includes a processor 210, a flash translation layer 220, a deduplication manager 230, a program manager 240, a host interface (HIF) 250, an error correction code (ECC) engine 260, a compression engine 270 and a memory interface (MIF) 280.

The flash translation layer 220, the deduplication manager 230 and the program manager 240 may correspond to the flash translation layer 130, the deduplication manager 150 and the program manager 170 in FIG. 1, respectively.

The processor 210 may control an operation of the storage controller 200 in response to a request received via the host interface 250 from a host device (e.g., the host device 30 in FIG. 1). For example, the processor 210 may control an operation of a storage device and/or a nonvolatile memory device (e.g., the storage device 50 and/or the nonvolatile memory device 300 in FIG. 1), and may control respective components by employing firmware for operating the storage device and/or the nonvolatile memory device. For example, the processor 210 may control the flash translation layer 220 such that a logical address received from the host device is converted into a physical address of the nonvolatile memory device. For example, the processor 210 may control the deduplication manager 230 such that a deduplication operation is performed on data received from the host device. For example, the deduplication manager 230 may generate and store a hash value compressed with several bytes using a compression technique before data is programmed in the nonvolatile memory device, and may perform the deduplication operation by comparing a hash value of data that is newly received from the host device with the stored hash value. The processor 210 may control the program manager 240 such that various operations required for the first program operation described with reference to FIG. 1 are performed on data stored in the nonvolatile memory device.

In some example embodiments, the flash translation layer 220 may include a mapping table 225 that includes a relationship between the logical address and the physical address. The deduplication manager 230 may include a reference count table 235 that includes a reference count value corresponding to the physical address and representing the number of times data is duplicated. The program manager 240 may include a target program mode table 247 that includes a relationship between the reference count value and the program modes.

In some example embodiments, the program manager 240 may further include a reference count/target program mode (RC/TPM) checker 241, a program waiting list (PGM WLST) 243 and a program buffer (PGM BFR) 245. When the reference count value is updated, the reference count/target program mode checker 241 may determine whether to perform the first program operation based on the target program mode table 247. When it is determined to perform the first program operation, the program waiting list 243 may store a first physical address and first target storage region information including a second physical address. The first physical address may correspond to a storage region of the nonvolatile memory device in which data that is a target of the first program operation is already programmed. The second physical address may correspond to a storage region of the nonvolatile memory device in which the first data is to be re-programmed. When it is determined to perform the first program operation, the program buffer 245 may temporarily store the data that is the target of the first program operation.

The ECC engine 260 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The compression engine 270 may generate compressed data by performing a data compression operation on original data corresponding to the program request from the host device based on a preset compression algorithm. For example, the compression algorithm may include a deflate algorithm, a Huffman algorithm, an arithmetic coding algorithm, etc.

The host interface 250 may provide physical connections between the host device and the storage device. The host interface 250 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The memory interface 280 may exchange data with the nonvolatile memory device. The memory interface 280 may transfer data to the nonvolatile memory device, or may receive data read from the nonvolatile memory device. In some example embodiments, the memory interface 280 may be connected to the nonvolatile memory via one channel. In other example embodiments, the memory interface 280 may be connected to the nonvolatile memory via two or more channels. For example, the memory interface 280 may be configured to comply with a standard protocol, such as Toggle or open NAND flash interface (ONFI).

Figure 4A:
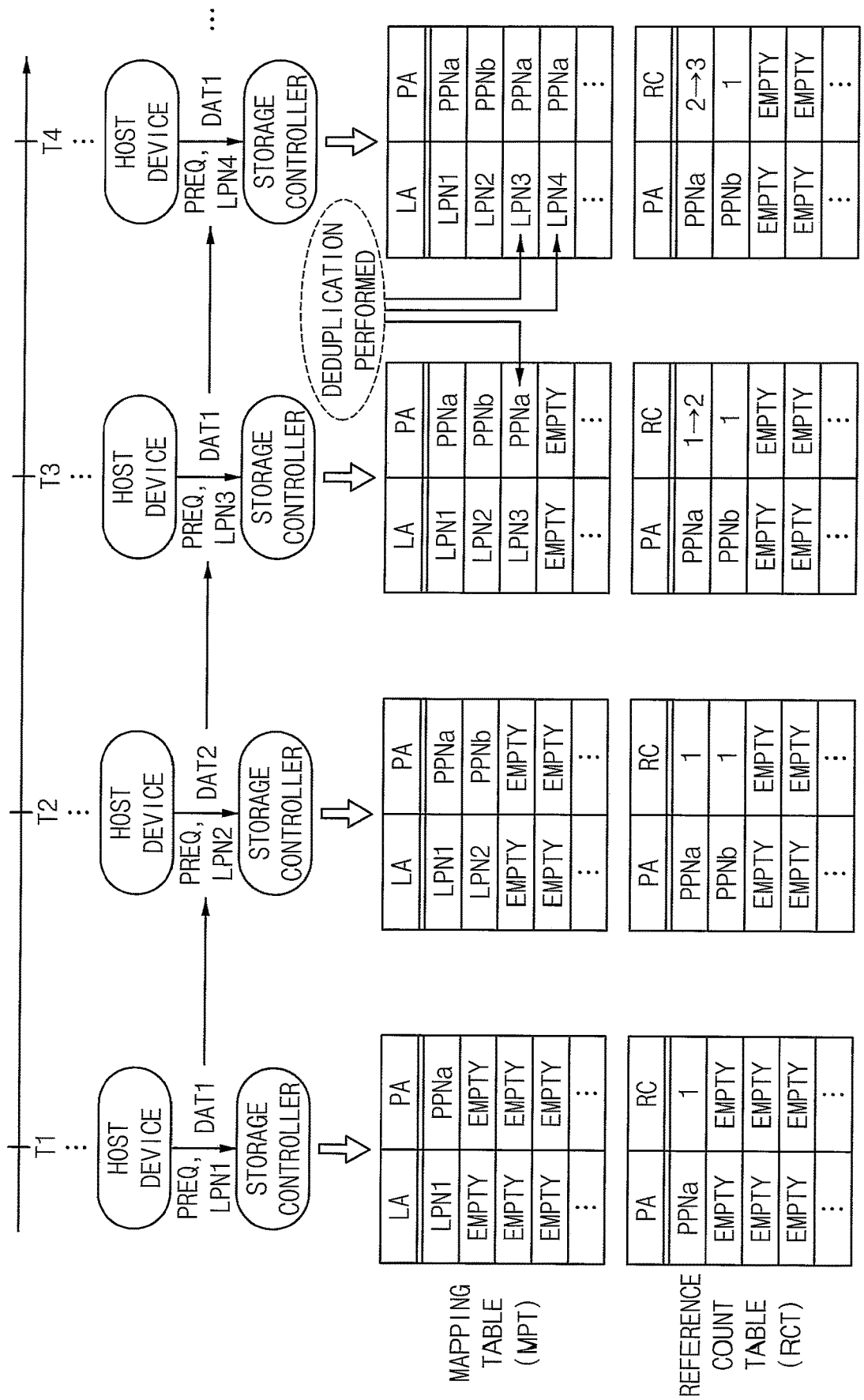

FIGS. 4A and 4B are diagrams for describing operations of updating a mapping table and a reference count table in FIG. 1.

FIGS. 4A and 4B illustrate examples where requests, logical addresses and data are transmitted from a host device (e.g., the host device 30 in FIG. 1) to a storage controller (e.g., the storage controller 100 in FIG. 1 and/or the storage controller 200 of FIG. 3) at time points T1, T2, T3, T4, T5, T6 and T7. Although FIGS. 4A and 4B illustrate that time points T1 to T7 are arranged at equal time intervals, example embodiments are not limited thereto. For example, as will be described with reference to FIG. 5, a time interval between two adjacent time points may be long enough for a storage device to enter an idle mode.

Referring to FIGS. 4A and 4B, at time point T1, the host device may transmit a program request PREQ to the storage controller, and may transmit a logical address LPN1 and data DAT1 that correspond to the program request PREQ to the storage controller. The storage controller may store the data DAT1 in a nonvolatile memory device (e.g., the nonvolatile memory device 300 in FIG. 1), and may update a mapping table (e.g., the mapping table 135 in FIG. 1 and/or the mapping table 225 in FIG. 3) and a reference count table (e.g., the reference count table 155 in FIG. 1 and/or the reference count table 235 in FIG. 3). For example, the storage controller may map the logical address LPN1 to a physical address PPNa in the mapping table, and may record a reference count value corresponding to the physical address PPNa as '1' in the reference count table. For example, in the first row of the reference count table, the physical address is "PA" and the reference count value corresponding thereto is "1."

At time point T2, the host device may transmit a program request PREQ to the storage controller, and may transmit a logical address LPN2 and data DAT2 that correspond to the program request PREQ to the storage controller. The storage controller may store the data DAT2 in the nonvolatile memory device, and may update the mapping table and the reference count. For example, the storage controller may map the logical address LPN2 to a physical address PPNb in the mapping table (see e.g., the second row of the mapping table), and may record a reference count value corresponding to the physical address PPNb as '1' in the reference count table (see e.g., the second row of the reference count table).

At time point T3, the host device may transmit a program request PREQ to the storage controller, and may transmit a logical address LPN3 and data DAT1 that correspond to the program request PREQ to the storage controller. When the data DAT1 received at time point T3 is received before time point T3 and is already stored in the nonvolatile memory device, the storage controller may perform the deduplication operation on the data DAT1 by logically programming the data DAT1 in the nonvolatile memory device without physically programming the data DAT1 in the nonvolatile memory device. In other words, since the data DAT1 received at the time point T3 was already received and stored in the nonvolatile memory device at the time point T1, the deduplication operation may be performed. Based on a result of performing the deduplication operation, the storage controller may map the logical address LPN3 to the physical address PPNa in the mapping table (see e.g., the third row of the mapping table), and may increase the reference count value corresponding to the physical address PPNa from '1' to '2' in the reference count table (see e.g., the first row of the reference count table).

At time point T4, the host device may transmit a program request PREQ to the storage controller, and may transmit a logical address LPN4 and data DAT1 that correspond to the program request PREQ to the storage controller. When the data DAT1 received at time point T4 is received before time point T4 and is already stored in the nonvolatile memory device, the storage controller may perform the deduplication operation on the data DAT1. Based on a result of performing the deduplication operation, the storage controller may map the logical address LPN4 to the physical address PPNa in the mapping table (see e.g., the fourth row of the mapping table), and may increase the reference count value corresponding to the physical address PPNa from '2' to '3' in the reference count table (see e.g., the first row of the reference count table).

At time point T5, the host device may transmit a program request PREQ to the storage controller, and may transmit a logical address LPN3 and data DAT3 that correspond to the program request PREQ to the storage controller. When the logical address LPN3 received at time point T5 is received before time point T5 and is already stored in the mapping table, the storage controller may map the logical address LPN3 to a physical address PPNc in the mapping table (see e.g., row three of the mapping table), may record a reference count value corresponding to the physical address PPNc as '1' in the reference count table (see e.g., row three of the reference count table), and may decrease the reference count value corresponding to the physical address PPNa from '3' to '2' in the reference count table (see e.g., row one of the reference count table).

At time point T6, the host device may transmit a program request PREQ to the storage controller, and may transmit a logical address LPN4 and data DAT3 that correspond to the program request PREQ to the storage controller. When the data DAT3 received at time point T6 is received before time point T6 and is already stored in the nonvolatile memory device, the storage controller may perform the deduplication operation on the data DAT3. Based on a result of performing the deduplication operation, the storage controller may map the logical address LPN4 to the physical address PPNc in the mapping table (see e.g., row four of the mapping table), and may increase the reference count value corresponding to the physical address PPNc from '1' to '2' in the reference count table (see e.g., row four of the reference count table). In addition, when the logical address LPN4 received at time point T6 is received before time point T6 and is already stored in the mapping table, the storage controller may map the logical address LPN4 to the physical address PPNc in the mapping table (see e.g., row four of the mapping table), and may decrease the reference count value corresponding to the physical address PPNa from '2' to '1' in the reference count table (see e.g., row one of the reference count table).

At time point T7, the host device may transmit an erase request EREQ to the storage controller, and may transmit a logical address LPN4 that corresponds to the erase request EREQ to the storage controller. The storage controller may release or delete the mapping or relationship between the logical address LPN4 and the physical address PPNc in the mapping table, and may decrease the reference count value corresponding to the physical address PPNc from '2' to '1' in the reference count table. In other words, row four of the mapping table may be emptied.

As described above, the deduplication operation may be performed at time points T3, T4 and T6 among time points T1 to T7, and thus the reference count values corresponding to or associated with the deduplication operation may increase. In addition, the data already stored in the nonvolatile memory device may be updated at time points T5 and T6 among time points T1 to T7, and thus the reference count values corresponding to or associated with the update operation may be increased or decreased. Further, the data already stored in the nonvolatile memory device may be erased at time point T7 among time points T1 to T7, and thus the reference count value corresponding to the erase operation may decrease.

FIG. 5 is a diagram for describing a first program operation performed based on the target program mode table 175 in FIG. 1.

In FIG. 5, time points T2, T3 and T4 may correspond to time points T2, T3 and T4 in FIG. 4A, respectively. Operations of the host device, the storage controller and the nonvolatile memory device at time points T2, T3 and T4 may be substantially the same as those described with reference to FIG. 4A. The descriptions repeated with FIG. 4A will be omitted.

Referring to FIGS. 4A and 5, at time point T2, the host device may transmit the program request PREQ to the storage controller, and may transmit the logical address LPN2 and the data DAT2 that correspond to the program request PREQ to the storage controller (operation S10). The storage controller may update the mapping table and the reference count table in response to operation S10 (operation S11), and may transmit a program command PCMD, the physical address PPNb and the data DAT2 that correspond to the program request PREQ to the nonvolatile memory device (operation S12). The nonvolatile memory device may program the data DAT2 in response to operation S12 (operation S13). At time point T3, the host device may transmit the program request PREQ to the storage controller, and may transmit the logical address LPN3 and the data DAT1 that correspond to the program request PREQ to the storage controller (operation S14). The storage controller may update the mapping table and the reference count table in response to operation S14 (operation S15), and may perform the deduplication operation (operation S16). At time point T4, the host device may transmit the program request PREQ to the storage controller, and may transmit the logical address LPN4 and the data DAT1 that correspond to the program request PREQ to the storage controller (operation S19).

In some example embodiments, the storage device including the storage controller and the nonvolatile memory device may enter an idle mode or may perform a garbage collection operation. For example, while the storage device enters the idle mode, or while the storage device performs the garbage collection operation, the storage controller may transmit a command CMDx and an address ADDRx, which are required for the nonvolatile memory device to perform the first program operation, to the nonvolatile memory device (operation S17), and the nonvolatile memory device may perform the first program operation described with reference to FIGS. 1 and 2 (operation S18).

In some example embodiments, when a first request (e.g., the program request PREQ in operation S14) is received from the host device, and when a second request (e.g., the program request PREQ in operation S19) subsequent to the first request is not received from the host device from a time point at which the first request is received until a preset idle mode entry time is elapsed, the storage device may enter the idle mode.

In some example embodiments, when the storage device satisfies a preset condition, a processor (e.g., the processor 210 in FIG. 3) included in the storage device may perform the garbage collection operation. For example, when invalid data stored in the nonvolatile memory device occupies more than a preset ratio in a storage region (e.g., the storage region 310 in FIG. 1) of the nonvolatile memory device, the processor may perform the garbage collection operation.

In some example embodiments, each of operations S10, S11, S12, S13, S14, S15, S16 and S19 may correspond to a normal operation of an electronic device including the host device, the storage controller and the nonvolatile memory device, and each of operations S17 and S18 may correspond to a background operation of the electronic system.

Figures 6, 7:
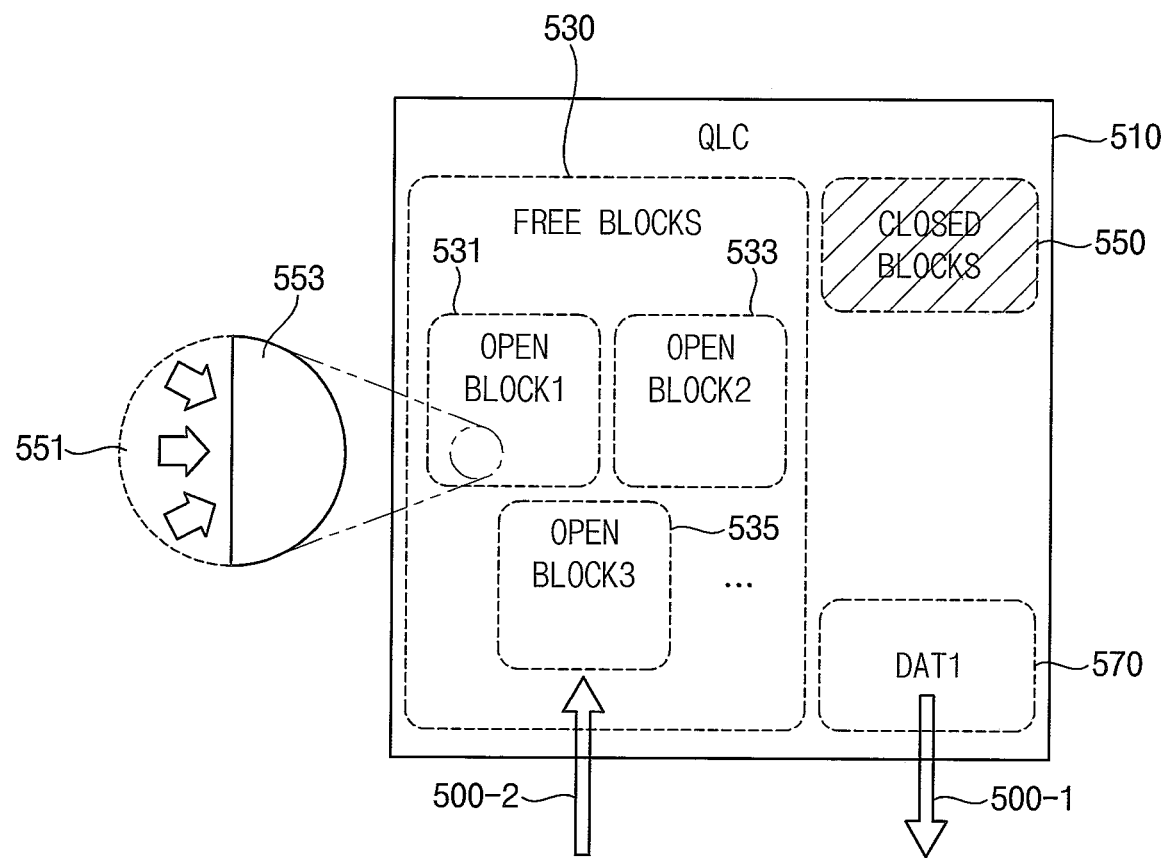
FIG. 6 is a diagram illustrating an example of a target program mode table in FIG. 1.
FIG. 7 is a diagram illustrating an example of a first program operation in FIG. 5.

FIG. 6 is a diagram illustrating an example of a target program mode table in FIG. 1.

Referring to FIG. 6, a target program mode table (e.g., the target program mode table 175 in FIG. 1) may include a relationship between a reference count value RC and a target program mode TPM.

In some example embodiments, when the reference count value RC is less than or equal to one, the target program mode TPM may be a quad level cell program mode QLC_PGM_MODE. When the reference count value RC is two or three, the target program mode TPM may be a pseudo multi level cell program mode pMLC_PGM_MODE. When the reference count value RC is greater than or equal to four, the target program mode TPM may be a pseudo single level cell program mode pSLC_PGM_MODE.

In some example embodiments, the pseudo single level cell program mode pSLC_PGM_MODE may correspond to a program mode of a higher tier than the quad level cell program mode QLC_PGM_MODE and the pseudo multi level cell program mode pMLC_PGM_MODE, and the quad level cell program mode QLC_PGM_MODE may correspond to a program mode of a lower tier than the pseudo single level cell program mode pSLC_PGM_MODE and the pseudo multi level cell program mode pMLC_PGM_ MODE. The pseudo multi level cell program mode pMLC_PGM_MODE may correspond to a program mode of an intermediate tier between the pseudo single level cell program mode pSLC_PGM_MODE and the quad level cell program mode QLC_PGM_MODE.

As described with reference to FIGS. 1 and 2, in the pseudo single level cell program mode pSLC_PGM_MODE, the nonvolatile memory device 300 may program 1-bit data in each memory cell included in the storage region (e.g., the storage region 310 of FIG. 1). In the pseudo multi level cell program mode pMLC_PGM_MODE, the nonvolatile memory device 300 may program 2-bit data in each memory cell included in the storage region. In the quad level cell program mode QLC_PGM_MODE, the nonvolatile memory device 300 may program 4-bit data in each memory cell included in the storage region.

As illustrated in FIG. 6, when the reference count value RC increases from '1' to '2', the target program mode TPM may be changed from the quad level cell program mode QLC_PGM_MODE to the pseudo multi level cell program mode pMLC_PGM_MODE. When the reference count value RC increases from '3' to '4', the target program mode TPM may be changed from the pseudo multi level cell program mode pMLC_PGM_MODE to the pseudo single level cell program mode pSLC_PGM_MODE. When the reference count value RC is less than or equal to one, e.g., when the reference count value RC increases from '0' to '1' or decreases from '1' to '0', the target program mode TPM is maintained to the quad level cell program mode QLC_PGM_MODE. When the reference count value RC increases from '2' to '3' or decreases from '3' to '2', the target program mode TPM is maintained to the pseudo multi level cell program mode pMLC_PGM_MODE. When the reference count value RC is greater than or equal to four, the target program mode TPM is maintained to the pseudo single level cell program mode pSLC_PGM_MODE.

As described with reference to FIG. 1, depending on the number of times the first data is duplicated, the storage device 50 may perform the first program operation in which the first data programmed with the first number of bits corresponding to the first program mode is re-programmed with the second number of bits corresponding to the second program mode. The reference count value may represent the number of times the data is duplicated, and the target program mode table 175 may include the relationship between the reference count value and the program modes, and thus the storage device 50 may perform the first program operation based on the reference count value and the target program mode table 175.

FIG. 7 is a diagram illustrating an example of a first program operation in FIG. 5.

FIG. 7 illustrates an example of a storage region 510 of the nonvolatile memory device 300. As described with reference to FIG. 1, the nonvolatile memory device 300 may include a plurality of dies, and each of the plurality of dies may include a plurality of blocks. The storage region 510 of the nonvolatile memory device 300 may be formed by the plurality of blocks, and the plurality of blocks may include a plurality of memory cells each of which stores data with the preset number of bits. For example, each of the plurality of memory cells may store N-bit data. For example, N may be four, and each of the plurality of memory cells may be a quad level cell in which 4-bit data may be stored.

Referring to FIGS. 1, 6 and 7, when the program request PREQ is received from the host device 30, and when the first data DAT1 corresponding to the program request PREQ is already stored in a block 570 of the nonvolatile memory device 300, the storage controller 100 may perform the deduplication operation by logically programming the first data DAT1 without physically programming the first data DAT1. When the program request PREQ or the erase request EREQ associated with the first data DAT1 is received from the host device 30, the storage controller 100 may update a first reference count value, which represents the number of times the first data DAT1 is duplicated from a first value to a second value. When it is determined based on the target program mode table 175 that a first program mode corresponding to the first value and a second program mode corresponding to the second value are different types of program modes, the storage controller 100 may transmit the command and the address to the nonvolatile memory device 300 such that the first program operation in which the first data programmed with the first number of bits corresponding to the first program mode is re-programmed with the second number of bits corresponding to the second program mode is performed.

In some example embodiments, before the first program operation is performed, the storage controller 100 may set one or more of the plurality of free blocks 530 of the nonvolatile memory device 300 as open blocks 531, 533 and 535, and may perform the first program operation on at least one of the open blocks 531, 533 and 535. For example, when it is determined that the first program mode and the second program mode are different types of program modes, and when the second program mode is the pseudo single level cell pSLC program mode, the storage controller 100 may read or retrieve the first data DAT1 from the nonvolatile memory device 300 (operation 500-1), may set a first free block among the plurality of free blocks 530 as the first open block 531 for performing the first program operation (e.g., the pseudo single level cell program operation), and may transmit the command and the address to the nonvolatile memory device 300 (operation 500-2) such that the first program operation is performed on the first open block 531. Similarly, when the second program mode is the pseudo multi level cell program mode or the pseudo triple level cell program mode, the storage controller 100 may set a second free block or a third free block among the plurality of free blocks 530 as the second open block 533 for the pseudo multi level cell program operation or the third open block 535 for the pseudo triple level cell program operation, and may transmit the command and the address to the nonvolatile memory device 300 such that the first program operation is performed on the second open block 533 or the third open block 535.

In some example embodiments, when the program request PREQ is received, and when the deduplication operation is performed on the first data DAT1, the first reference count value may increase. When the erase request EREQ is received, and when the erase operation is performed on the first data DAT1 the first reference count value may decrease. When the program request PREQ is received, and when the update operation for changing the first data DAT1 is performed, the first reference count value may decrease.

In some example embodiments, when the second value is greater than the first value, and when the second program mode and the first program mode are different types of program modes, the first program operation may be performed, and the second number of bits may be smaller than the first number of bits. When the first program mode and the second program mode are the same type of program mode, the first program operation may not be performed and may be omitted.

In some example embodiments, when the second value is smaller than the first value, and when the second program mode and the first program mode are different types of program modes, the first program operation may be performed, and the second number of bits may be greater than the first number of bits. When the first program mode and the second program mode are the same type of program mode, the first program operation may not be performed and may be omitted.

In some example embodiments, when the program request PREQ or the erase request EREQ associated with the first data DAT1 is received from the host device 30 after the first reference count value is updated from the first value to the second value and after the first program operation is performed, the first reference count value may be additionally updated from the second value to a third value. When it is determined based on the target program mode table 175 that the second program mode corresponding to the second value and a third program mode corresponding to the third value are different types of program modes, a command and an address may be additionally transmitted to the nonvolatile memory device 300 such that a second program operation in which the first data programmed with the second number of bits corresponding to the second program mode is re-programmed with a third number of bits corresponding to the third program mode is additionally performed. When the second program mode and the third program mode are the same type of program mode, the second program operation may not be performed and may be omitted.

For example, as described with reference to FIGS. 1 and 4A, the first data DAT1 corresponding to the program request PREQ at time point T1 may be data that is initially programmed in the nonvolatile memory device 300, and the first reference count value of the first data DAT1 may be recorded as '1'. Based on the target program mode table of FIG. 6, the first data DAT1 may be programmed in the nonvolatile memory device 300 in the quad level cell program mode QLC_PGM_MODE corresponding to the first reference count value (e.g., '1'). This is because the first reference count value of "1" is associated with tier 3 and the quad level cell program mode QLC_PGM_MODE. After that, the first data DAT1 corresponding to the program request PREQ at the time point T3 is already stored in the nonvolatile memory device 300 at the time point T1, and the first reference count value of the first data DAT1 may increase from the first value (e.g., '1') to the second value (e.g., '2'). In this case, the target program mode corresponding to the second value of "2" may change to the pseudo multi level cell program mode pMLC_PGM_MODE. Based on the target program mode table of FIG. 6, it may be determined that the first program mode corresponding to the first value and the second program mode corresponding to the second value are different types of program modes (e.g., the first program mode may be the quad level cell program mode QLC_PGM_MODE and the second program mode may be the pseudo multi level cell program mode pMLC_PGM_MODE), and thus the first data DAT1 may be read from the nonvolatile memory device 300 and may be re-programmed in the nonvolatile memory device 300 in the second program mode.

As illustrated in FIG. 7, the first program operation may be performed on the open blocks 531, 533 and 535 of the nonvolatile memory device 300. Unlike closed blocks 550, the open blocks 531, 533 and 535 may represent blocks in which a storage space capable of programming valid data remains.

In some example embodiments, using the compression engine 270 described with reference to FIG. 3, the storage controller 100 may generate the compressed data by performing the data compression operation on the original data corresponding to the program request PREQ from the host device 30 based on a preset compression algorithm. For example, when the data compression operation is performed, the compressed data may be programmed in a storage region 553 of the nonvolatile memory device 300. In contrast, if the data compression operation is not performed, the original data may be stored in the storage regions 551 and 553 of the nonvolatile memory device 300. Thus, as compared to storing the original data in the nonvolatile memory device 300, the storage region 553 of the nonvolatile memory device 300 in which the first data DAT1 is stored by performing the first program operation may be a saved storage region by storing the compressed data in the nonvolatile memory device 300 when the data compression operation is performed.

Figure 8:
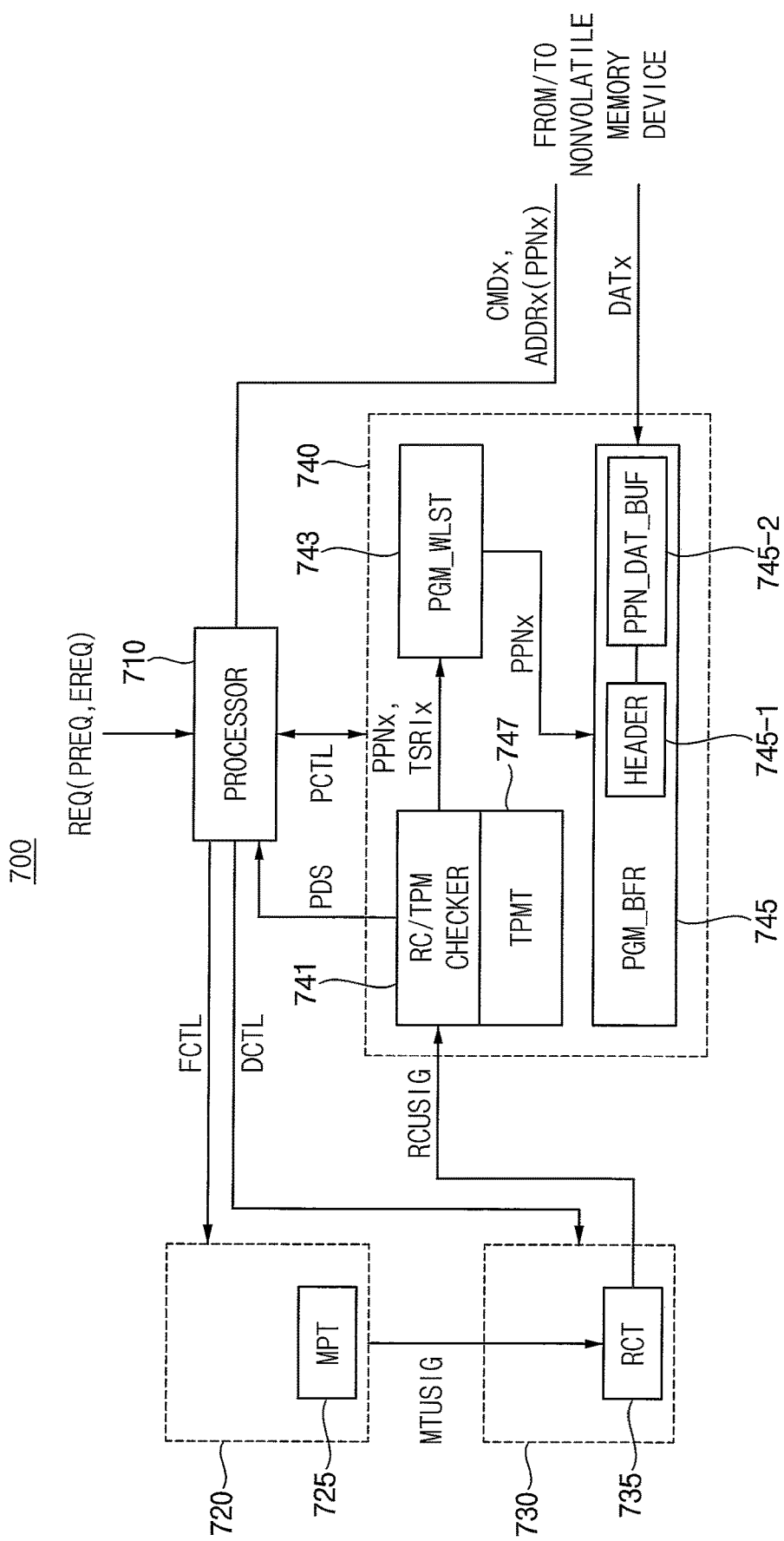
FIG. 8 is a block diagram illustrating an example of a storage controller included in the storage device of FIG. 1.

FIG. 8 is a block diagram illustrating an example of a storage controller included in the storage device 50 of FIG. 1.

Referring to FIG. 8, a storage controller 700 includes a processor 710, a flash translation layer 720, a deduplication manager 730 and a program manager 740. The processor 710, the flash translation layer 720, the deduplication manager 730 and the program manager 740 may correspond to the processor 210, the flash translation layer 220, the deduplication manager 230 and the program manager 240 in FIG. 3, respectively. The descriptions repeated with FIG. 3 will be omitted.

The flash translation layer 720 may include a mapping table 725. The deduplication manager 730 may include a reference count table 735. The program manager 740 may include a reference count/target program mode checker 741, a program waiting list 743, a program buffer 745 and a target program mode table 747.

The processor 710 may control operations of components included in the storage controller 700, and may control the entry of the idle mode of the storage device 50 or the garbage collection operation described with reference to FIG. 5. For example, the processor 710 may provide control signals FCTL, DCTL and PCTL to the flash translation layer 720, the deduplication manager 730 and the program manager 740, respectively.

When the mapping table 725 is updated, the flash translation layer 720 may transmit a mapping table update signal MTUSIG representing the update of the mapping table 725 to the deduplication manager 730. In other words, the mapping table update signal MTUSIG may indicate that the mapping table 725 has been updated. When the reference count table 735 is updated, the deduplication manager 730 may transmit a reference count table update signal RCUSIG representing the update of the reference count table 735 to the program manager 740. In other words, the count table update signal RCUSIG may indicate that the reference count table 735 has been updated.

When the first reference count value is updated as described with reference to FIG. 7, the reference count/target program mode checker 741 may determine whether to perform the first program operation based on the target program mode table 747. When it is determined to perform the first program operation, the program waiting list 743 may store a first physical address PPNx and first target storage region information TSRIx including a second physical address. The first physical address PPNx may correspond to a storage region in which the first data that is the target of the first program operation is already programmed, and the second physical address may correspond to a storage region in which the first data is to be re-programmed. When it is determined to perform the first program operation, the program buffer 745 may temporarily store the first data. For example, as illustrated in FIG. 8, the first data may be stored in the program buffer 745 in the form of a header 745-1 and buffer data 745-2.

In some example embodiments, when it is determined that the first program mode and the second program mode are different types of program modes, the reference count/target program mode checker 741 may output a first program operation determination signal PDS representing that it is determined to perform the first program operation to the processor 710, and may output the first physical address PPNx and the first target storage region information TSRIx to the program waiting list 743. In other words, the reference count/target program mode checker 741 may output the first physical address PPNx which corresponds to a storage region where the first data was programmed, and the second physical address which corresponds to where the first data is to be re-programmed.

In some example embodiments, the storage controller 700 may perform the first program operation using only some of the components included in the program manager 740. For example, when the storage device 50 performs the garbage collection operation, a migration operation may be performed on valid data stored in the nonvolatile memory device 300. The storage controller 700 may read the valid data, and may perform the first program operation based on a reference count value corresponding to the valid data and the target program mode table 747. For example, the first program operation may be performed while being included in the migration operation depending on the execution of the garbage collection operation, and thus the first program operation may be performed without additional overhead occurring in the garbage collection operation. In this example, the program manager 740 may enable only the reference count/target program mode checker 741 to determine whether to perform the first program operation, and may perform operations associated with the first program operation without recording or storing information associated with the valid data in the program waiting list 743 and the program buffer 745.

Figure 9:
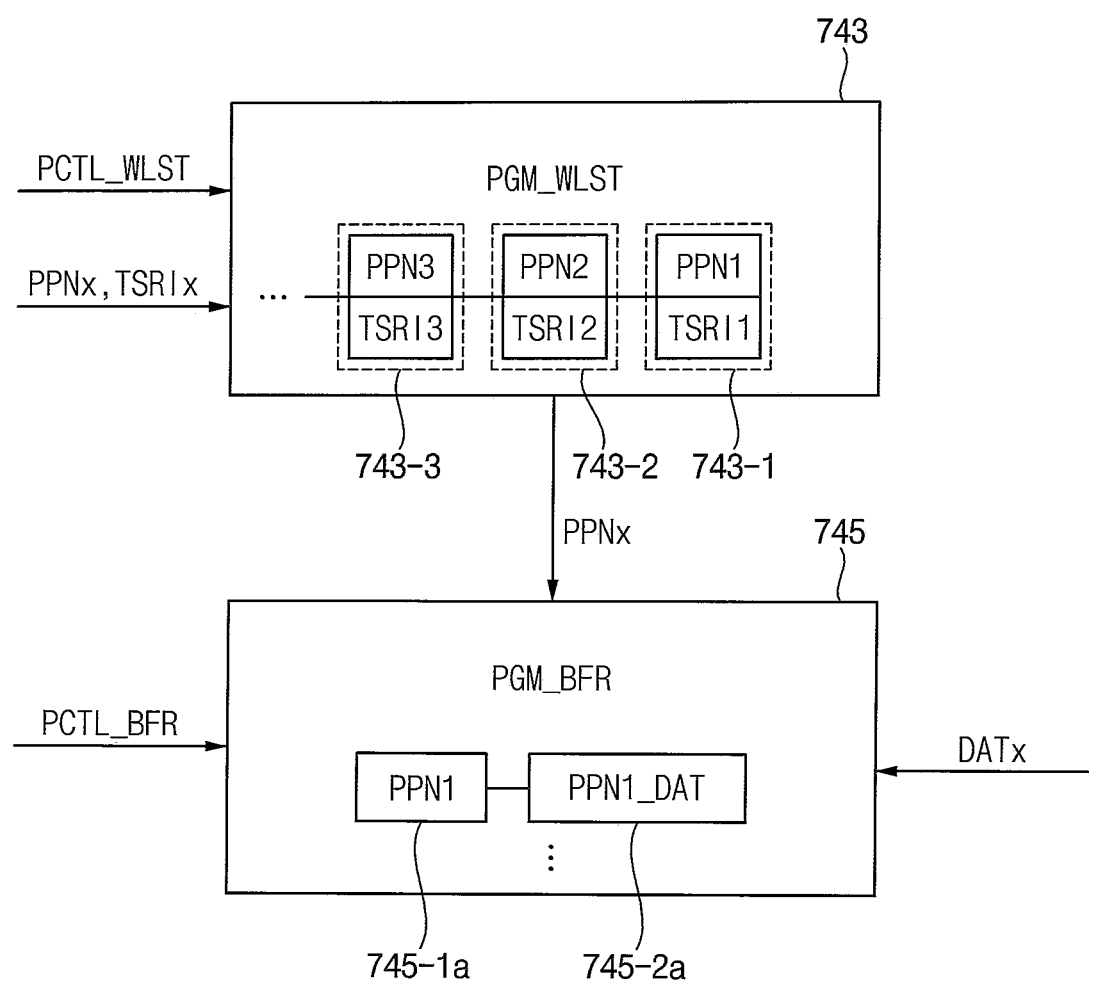
FIG. 9 is a diagram for describing an operation of a program manager in FIG. 8.

FIG. 9 is a diagram for describing an operation of a program manager in FIG. 8.

Referring to FIGS. 8 and 9, when it is determined to perform the first program operation, the program waiting list 743 may receive the first physical address PPNx and the first target storage region information TSRIx including the second physical address from the reference count/target program mode checker 741 based on a first control signal PCTL_WLST received from the processor 710. As illustrated in FIG. 9, the program waiting list 743 may store physical addresses and target storage region information 743-1, 743-2 and 743-3 that are received from the reference count/target program mode checker 741 at different time points, and may maintain the physical addresses and target storage region information 743-1, 743-2 and 743-3 until the first program operation corresponding to the physical addresses and target storage region information 743-1, 743-2 and 743-3 are performed. As an example, the physical addresses and target storage region information of 743-1 may include the first physical address PPN1 and TSRI1.

As described with reference to FIG. 5, when the second request subsequent to the first request is not received from the host device from a time point at which the first request is received until the idle mode entry time is elapsed, the storage device 50 may enter the idle mode. While the storage device 50 enters the idle mode, the program buffer 745 may receive the first physical address (e.g., PPN1 in 743-1) from the program waiting list 743 and may store the first physical address as a header 745-1a, and may receive the first data (e.g., PPN1_DAT) stored in a region corresponding to the first physical address of the nonvolatile memory device 300 and may store the first data as buffer data 745-2a based on the first physical address received from the program waiting list 743 and a second control signal PCTL_BFR received from the processor 710.

While the storage device 50 enters the idle mode, it may be checked whether the second request is received from the host device 30. For example, after it is checked that the second request is not received from the host device 30, the first data stored in the program buffer 745 as the buffer data 745-2a may be programmed in the nonvolatile memory device 300. In this manner, the first program operation may operate as the background operation described with reference to FIG. 5.

FIG. 10 is a diagram illustrating an example of a target program mode table in FIG. 1.

Referring to FIG. 10, a target program mode table (e.g., the target program mode table 175 in FIG. 1) may include a relationship between a reference count value RC and a target program mode TPM. The descriptions repeated with FIG. 6 will be omitted.

In some example embodiments, when the reference count value RC is less than or equal to one, the target program mode TPM may be a quad level cell program mode QLC_PGM_MODE. When the reference count value RC is two, the target program mode TPM may be a pseudo triple level cell program mode pTLC_PGM_MODE. When the reference count value RC is three, the target program mode TPM may be a pseudo multi level cell program mode pMLC_PGM_MODE. When the reference count value RC is greater than or equal to four, the target program mode TPM may be a pseudo single level cell program mode pSLC_PGM_MODE.

As described with reference to FIGS. 1 and 2, in the pseudo single level cell program mode pSLC_PGM_MODE, the nonvolatile memory device 300 may program 1-bit data in each memory cell included in the storage region (e.g., the storage region 310 of FIG. 1). In the pseudo multi level cell program mode pMLC_PGM_MODE, the nonvolatile memory device 300 may program 2-bit data in each memory cell included in the storage region. In the pseudo triple level cell program mode pTLC_PGM_MODE, the nonvolatile memory device 300 may program 3-bit data in each memory cell included in the storage region. In the quad level cell program mode QLC_PGM_MODE, the nonvolatile memory device 300 may program 4-bit data in each memory cell included in the storage region.

As illustrated in FIG. 10, when the reference count value RC increases from '1' to '2', the target program mode TPM may be changed from the quad level cell program mode QLC_PGM_MODE to the pseudo triple level cell program mode pTLC_PGM_MODE. When the reference count value RC increases from '2' to '3', the target program mode TPM may be changed from the pseudo triple level cell program mode pTLC_PGM_MODE to the pseudo multi level cell program mode pMLC_PGM_MODE. When the reference count value RC increases from '3' to '4', the target program mode TPM may be changed from the pseudo multi level cell program mode pMLC_PGM_MODE to the pseudo single level cell program mode pSLC_PGM_MODE. When the reference count value RC is less than or equal to one, the target program mode TPM is maintained to the quad level cell program mode QLC_PGM_MODE. When the reference count value RC is greater than or equal to four, the target program mode TPM is maintained to the pseudo single level cell program mode pSLC_PGM_MODE.

As described with reference to FIG. 1, depending on the number of times the first data is duplicated, the storage device 50 may perform the first program operation in which the first data programmed with the first number of bits corresponding to the first program mode is re-programmed with the second number of bits corresponding to the second program mode. The reference count value may represent the number of times the data is duplicated, and the target program mode table 175 may include the relationship between the reference count value and the program modes, and thus the storage device 50 may perform the first program operation based on the reference count value and the target program mode table 175.

Figure 11:
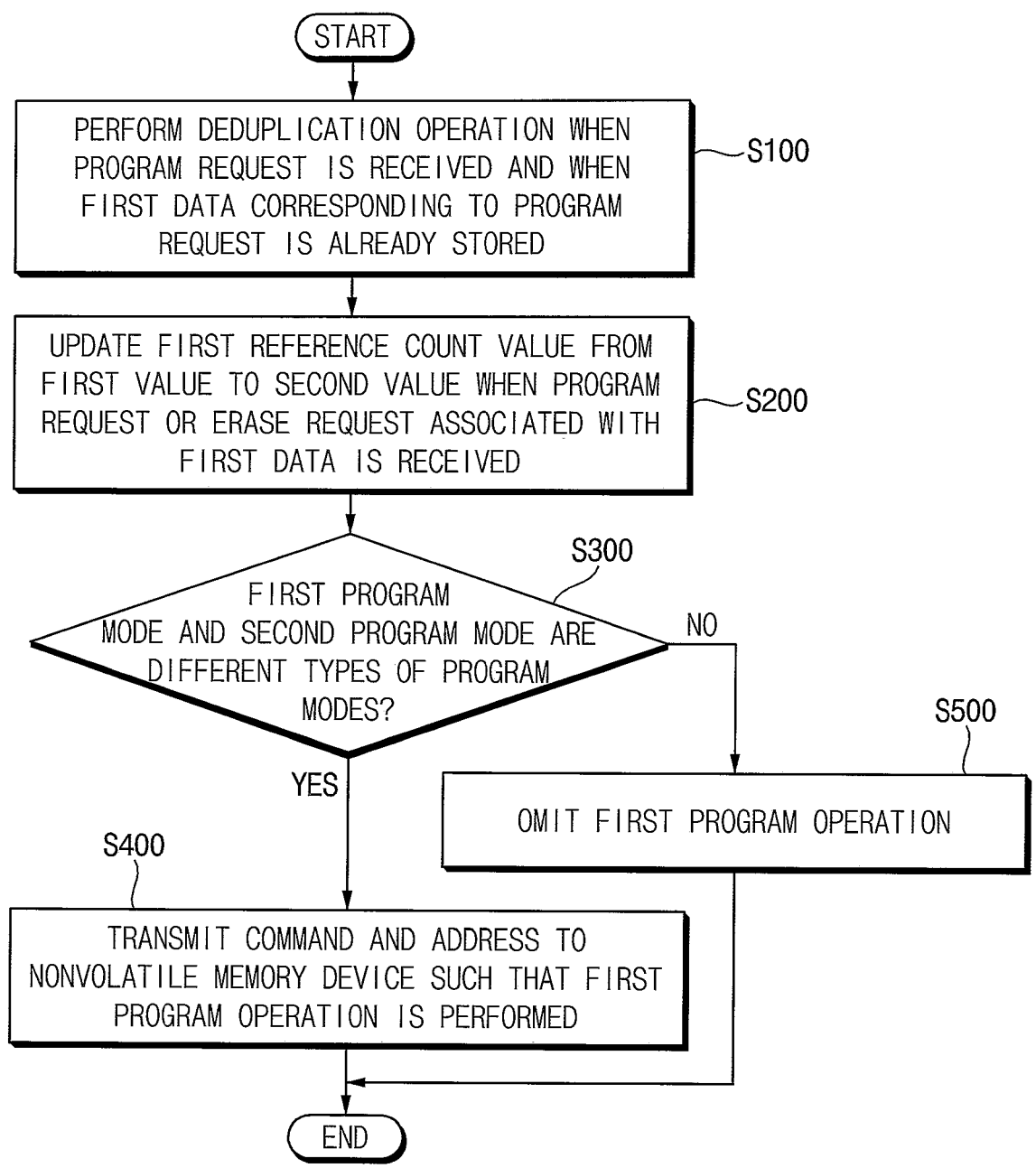
FIG. 11 is a flowchart illustrating a method of operating a storage device according to example embodiments of the present disclosure.

FIG. 11 is a flowchart illustrating a method of operating a storage device according to example embodiments.

Referring to FIG. 11, when a program request is received from a host device 30, and when first data corresponding to the program request is already stored in a nonvolatile memory device (e.g., the nonvolatile memory device 300 of FIG. 1), a deduplication operation is performed on the first data (operation S100).

In some example embodiments, the deduplication operation may represent an operation in which the first data is logically programmed without being physically programmed. For example, the deduplication operation may be performed by updating only a mapping table (e.g., 135 of FIG. 1) included in a storage controller without writing the first data to the nonvolatile memory device.

When the program request or an erase request associated with the first data is received from the host device 30, a first reference count value is updated from a first value to a second value (operation S200). The first reference count value may represent the number of times the first data is duplicated.

It is determined based on a target program mode table whether a first program mode corresponding to the first value and a second program mode corresponding to the second value are different types of program modes (operation S300).

When it is determined that the first program mode and the second program mode are different types of program modes (operation S300: YES), a command and an address are transmitted to the nonvolatile memory device such that a first program operation in which the first data programmed with a first number of bits corresponding to the first program mode is programmed or re-programmed with a second number of bits corresponding to the second program mode is performed (operation S400).

When it is determined that the first program mode and the second program mode are the same type of program mode (operation S300: NO), the first program operation is omitted (operation S500).

In some example embodiments, operations S100, S200, S300 and S400 may be performed by the storage controller 100 in FIG. 1 or the storage controller 200 of FIG. 3.

In some example embodiments, the nonvolatile memory device may include a plurality of dies, and each of the plurality of dies may include a plurality of blocks. A storage region in the nonvolatile memory device may be formed by the plurality of blocks, and the plurality of blocks may include a plurality of memory cells each of which stores data with a preset (or predetermined) number of bits. For example, each of the plurality of memory cells may store N-bit data, where N is an integer greater than or equal to two.

In some example embodiments, the program modes may be operation modes for programming the data with the preset number of bits in the nonvolatile memory device.

In some example embodiments, when the program request is received, and when the deduplication operation is performed on the first data, the first reference count value may increase. In addition, when the second value is greater than the first value, and when the second program mode and the first program mode are different types of program modes, the first program operation may be performed. In this example, the second number of bits may be smaller than the first number of bits.

Figure 12:
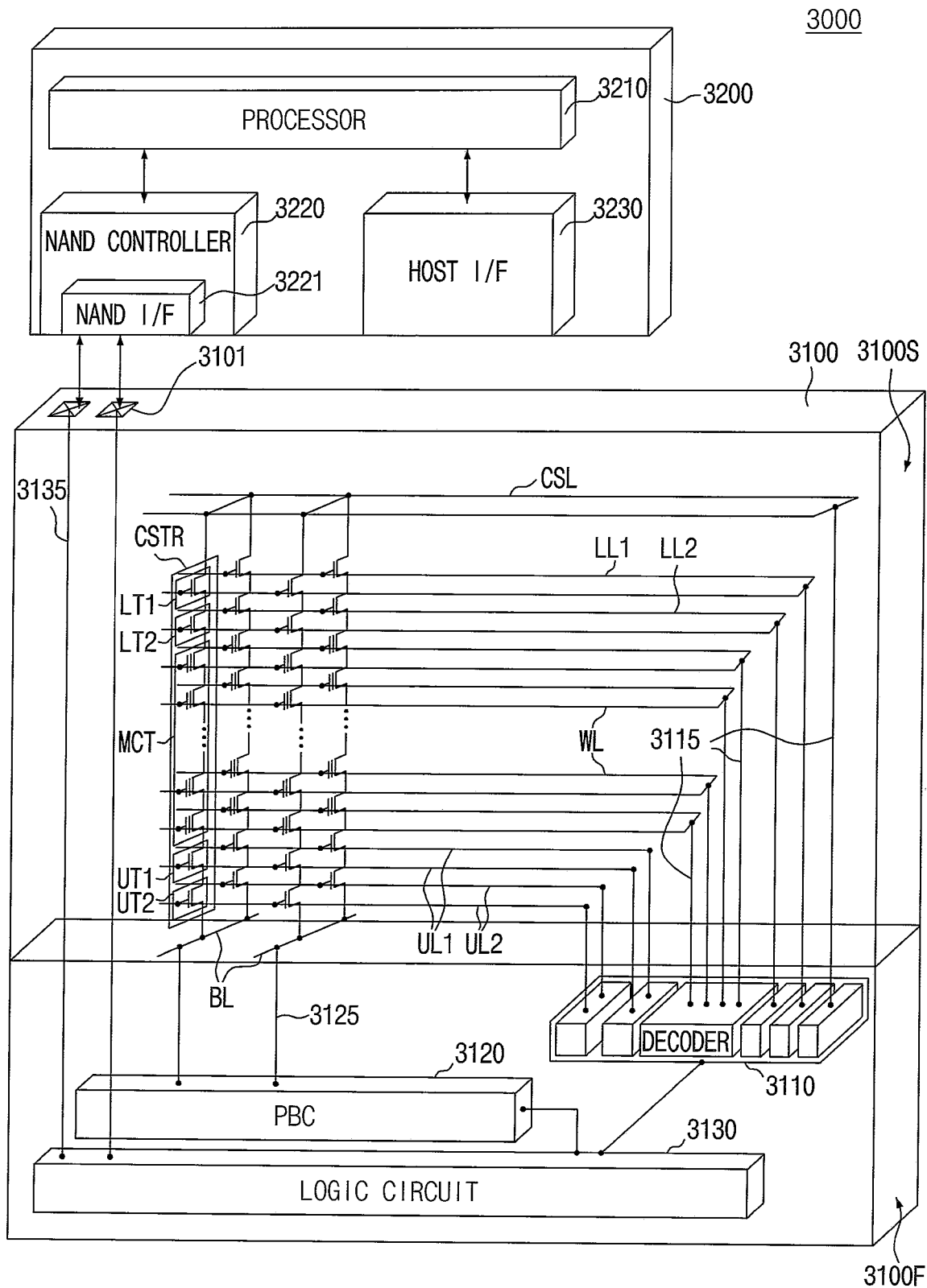
FIG. 12 is a block diagram illustrating an electronic system including a storage device according to example embodiments of the present disclosure.

FIG. 12 is a block diagram illustrating an electronic system including a storage device according to example embodiments.

Referring to FIG. 12, an electronic system 3000 may include a semiconductor device 3100 and a controller 3200 electrically connected to the semiconductor device 3100. The electronic system 3000 may be a storage device including one or a plurality of semiconductor devices 3100 or an electronic device including the storage device. For example, the electronic system 3000 may be a solid state drive (SSD) device, a universal serial bus (USB), a computing system, a medical device, or a communication device that may include one or a plurality of semiconductor devices 3100.

The semiconductor device 3100 may be a memory device, for example, the nonvolatile memory device according to example embodiments described with reference to FIG. 1. The semiconductor device 3100 may include a first structure 3100F and a second structure 3100S on the first structure 3100F. In other words, the first structure 3100F may be stacked on the first structure 3100S. The first structure 3100F may be a peripheral circuit structure including a decoder circuit 3110, a page buffer circuit 3120, and a logic circuit 3130. The second structure 3100S may be a memory cell structure including bitlines BL, a common source line CSL, wordlines WL, first and second upper gate lines UL1 and UL2, first and second lower gate lines LL1 and LL2, and memory cell strings CSTR between the bitlines BL and the common source line CSL.

In the second structure 3100S, each of the memory cell strings CSTR may include lower transistors LT1 and LT2 adjacent to the common source line CSL, upper transistors UT1 and UT2 adjacent to the bitlines BL, and a plurality of memory cell transistors MCT between the lower transistors LT1 and LT2 and the upper transistors UT1 and UT2.

In the first structure 3100F, the decoder circuit 3110, the page buffer circuit 3120 and the logic circuit 3130 may correspond to an address decoder, a page buffer circuit and a control circuit included in the nonvolatile memory device according to example embodiments, respectively.

The common source line CSL, the first and second lower gate lines LL1 and LL2, the wordlines WL, and the first and second upper gate lines UL1 and UL2 may be electrically connected to the decoder circuit 3110 through first connection wirings 3115 extending to the second structure 3110S in the first structure 3100F. For example, the first connection wirings 3115 may extend from the decoder circuit 3110 to the wordlines WL. The bitlines BL may be electrically connected to the page buffer circuit 3120 through second connection wirings 3125 extending to the second structure 3100S in the first structure 3100F. For example, the second connection wirings 3125 may extend from the page buffer circuit 3120 to the bitlines BL. An input/output pad 3101 may be electrically connected to the logic circuit 3130 through an input/output connection wiring 3135 extending to the second structure 3100S in the first structure 3100F.

The controller 3200 may include a processor 3210, a NAND controller 3220 and a host interface 3230. The electronic system 3000 may include a plurality of semiconductor devices 3100, and in this case, the controller 3200 may control the plurality of semiconductor devices 3100. The processor 3210, a NAND interface 3221 included in the NAND controller 3220, and the host interface 3230 may correspond to the processor 210, the memory interface 280 and the host interface 250 in FIG. 3, respectively.

The electronic system 3000 may perform the method of operating the storage device according to example embodiments described with reference to FIGS. 1 through 11.

Figure 13:
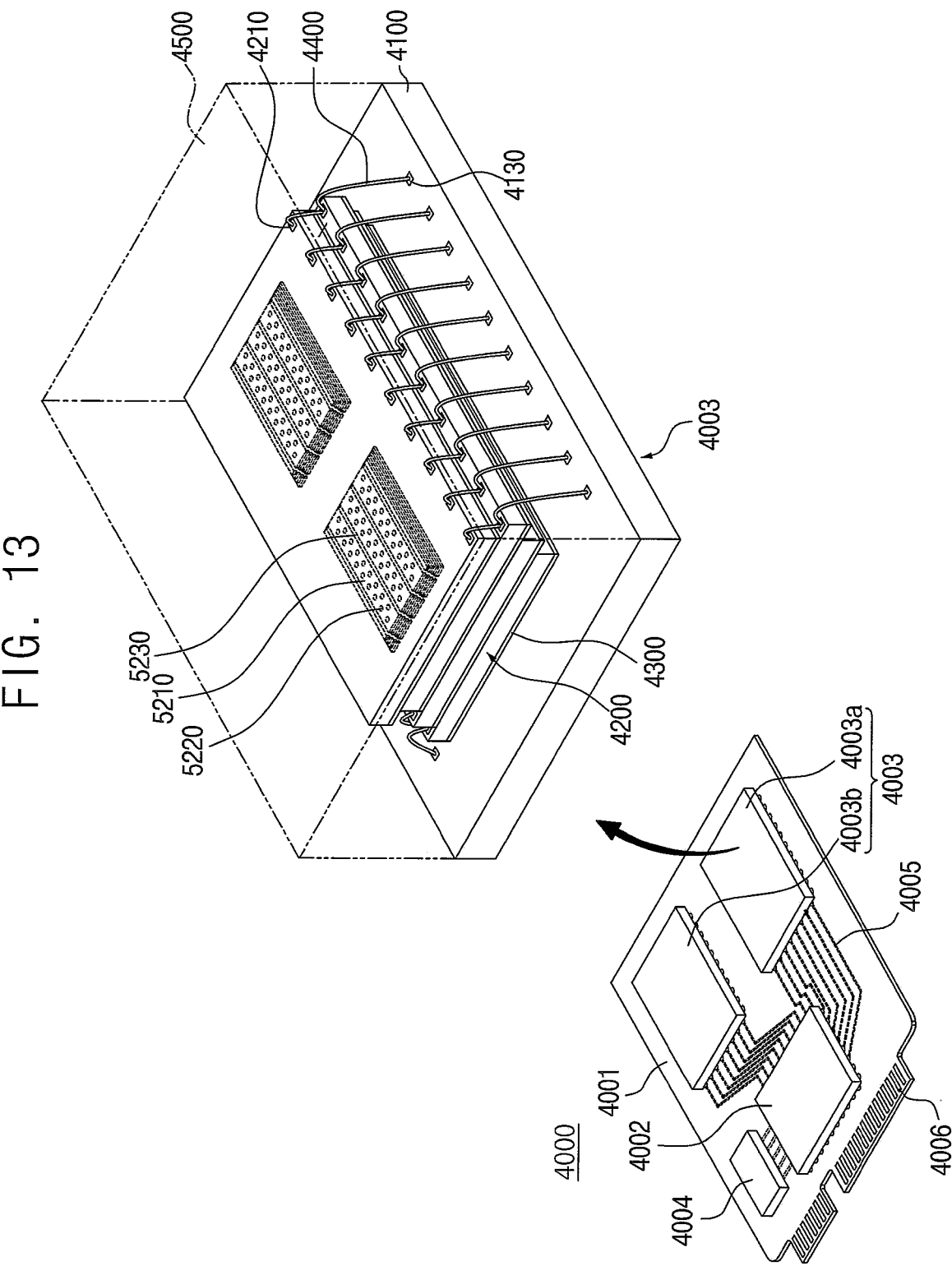
FIG. 13 is a perspective view of an electronic system including a storage device according to example embodiments of the present disclosure.

FIG. 13 is a perspective view of an electronic system including a storage device according to example embodiments.

Referring to FIG. 13, an electronic system 4000 may include a main substrate 4001, a controller 4002 mounted on the main substrate 4001, at least one semiconductor package 4003, and a dynamic random access memory (DRAM) device 4004. The semiconductor package 4003 and the DRAM device 4004 may be connected to the controller 4002 by wiring patterns 4005 on the main substrate 4001.

The main substrate 4001 may include a connector 4006 having a plurality of pins connected to an external host. The number and layout of the plurality pins in the connector 4006 may be changed depending on a communication interface between the electronic system 4000 and an external host. In some example embodiments, the electronic system 4000 may be driven or may operate by a power source provided from the external host through the connector 4006.

The controller 4002 may write data in the semiconductor package 4003 or read data from the semiconductor package 4003, and may enhance an operation speed of the electronic system 4000.

The DRAM device 4004 may be a buffer memory for reducing the speed difference between the semiconductor package 4003 for storing data and the external host. The DRAM device 4004 included in the electronic system 4000 may serve as a cache memory, and may provide a space for temporarily storing data during a control operation for the semiconductor package 4003.

The semiconductor package 4003 may include first and second semiconductor packages 4003a and 4003b spaced apart from each other. The first and second semiconductor packages 4003a and 4003b may be semiconductor packages each of which includes a plurality of semiconductor chips 4200. Each of the first and second semiconductor packages 4003a and 4003b may include a package substrate 4100, the semiconductor chips 4200, bonding layers 4300 disposed under the semiconductor chips 4200, a connection structure 4400 for electrically connecting the semiconductor chips 4200 with the package substrate 4100, and a mold layer 4500 covering the semiconductor chips 4200 and the connection structure 4400 on the package substrate 4100.

The package substrate 4100 may be a printed circuit board (PCB) including package upper pads 4130. Each semiconductor chip 4200 may include an input/output pad 4210. The input/output pad 4210 may correspond to the input/output pad 3101 in FIG. 12. Each semiconductor chip 4200 may include gate electrode structures 5210, memory channel structures 5220 extending through the gate electrode structures 5210, and division structures 5230 for dividing the gate electrode structures 5210. Each semiconductor chip 4200 may include the nonvolatile memory device according to example embodiments.

In some example embodiments, the connection structure 4400 may be a bonding wire for electrically connecting the input/output pad 4210 and the package upper pads 4130.

As described above, in the storage device according to example embodiments, the first program operation in which the first data programmed with the first number of bits corresponding to the first program mode is re-programmed with the second number of bits corresponding to the second program mode may be performed based on the number of times the first data is duplicated. The first program operation may be performed based on the target program mode table that includes the relationship between the program modes and the reference count value that represents the number of times the first data is duplicated. The storage device may have improved or enhanced read performance for the first data by performing the first program operation. In addition, if the number of times the first data is duplicated increases, a size of a storage space occupied by the first data on which the first program operation is performed in the nonvolatile memory device may not increase due to the deduplication operation in which the first data is physically programmed only once in the nonvolatile memory device. Accordingly, the storage device may have the improved read performance for the first data without increasing the size of the storage space occupied by the first data in the nonvolatile memory device.

The inventive concept may be applied to various electronic devices and systems that include the storage devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings of the example embodiments. Accordingly, all such modifications are intended to be included within the scope of the example embodiments as set forth in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage device, comprising:
a nonvolatile memory device configured to store data based on program modes for programming data with a preset number of bits; and
a storage controller including a target program mode table including a relationship between a reference count value and the program modes, the reference count value representing a number of times data is duplicated, the program modes including a first program mode, a second program mode and a third program mode, the first program mode corresponding to a case where a first value of a first reference count value is less than or equal to a first threshold, the third program mode corresponding to a case where a third value of the first reference count value is greater than or equal to a second threshold and the second program mode corresponding to a case where a second value of the first reference count value is between the first threshold and the second threshold,
wherein the storage controller is configured to:
in response to a program request being received from a host device, and in response to first data corresponding to the program request being already stored in the nonvolatile memory device, perform a deduplication operation in which the first data is logically programmed and not physically programmed,
in response to the program request or an erase request associated with the first data being received from the host device, update the first reference count value from the first value to the second value, the first reference count value representing a number of times the first data is duplicated, and
in response to a determination based on information in the target program mode table that the first program mode corresponding to the first value and the second program mode corresponding to the second value are different, transmit a first command and a first address to the nonvolatile memory device such that a first program operation in which the first data programmed with a first number of bits corresponding to the first program mode is re-programmed with a second number of bits corresponding to the second program mode is performed.

2. The storage device of claim 1, wherein:
in response to the program request being received, and in response to the deduplication operation being performed on the first data, the first reference count value increases,
in response to the second value being greater than the first value, and in response to the second program mode and the first program mode being different, the first program operation is performed, and
the second number of bits is smaller than the first number of bits.

3. The storage device of claim 2, wherein:
in response to the second value being greater than the first value, and in response to the first program mode and the second program mode being a same type of program mode, the first program operation is not performed.

4. The storage device of claim 1, wherein:
in response to the erase request being received, and in response to an erase operation being performed on the first data, the first reference count value decreases,
in response to the second value being smaller than the first value, and in response to the second program mode and the first program mode being different, the first program operation is performed, and
the second number of bits is greater than the first number of bits.

5. The storage device of claim 4, wherein:
in response to the second value being smaller than the first value, and in response to the first program mode and the second program mode being a same type of program mode, the first program operation is not performed.

6. The storage device of claim 1, wherein the storage controller is configured to:
in response to the program request or the erase request associated with the first data being received from the host device after the first reference count value is updated from the first value to the second value and after the first program operation is performed, additionally update the first reference count value from the second value to the third value, and in response to a determination based on the information in the target program mode table that the second program mode corresponding to the second value and the third program mode corresponding to the third value are different, additionally transmit a second command and a second address to the nonvolatile memory device such that a second program operation in which the first data programmed with the second number of bits corresponding to the second program mode is re-programmed with a third number of bits corresponding to the third program mode is additionally performed.

7. The storage device of claim 6, wherein, in response to the second program mode and the third program mode being a same type of program mode, the second program operation is not performed.

8. The storage device of claim 1, wherein the storage controller includes:
a flash translation layer (FTL) configured to convert a logical address received from the host device into a physical address of the nonvolatile memory device;
a deduplication manager configured to perform the deduplication operation; and
a program manager configured to perform the first program operation.

9. The storage device of claim 8, wherein:
the flash translation layer includes a mapping table including a relationship between the logical address and the physical address,
the deduplication manager includes a reference count table including the reference count value corresponding to the physical address, and
the program manager includes the target program mode table.

10. The storage device of claim 9, wherein the program manager further includes:
a reference count/target program mode checker configured to determine whether to perform the first program operation by using the target program mode table in response to the first reference count value being updated;
a program waiting list configured to store a first physical address and first target storage region information including a second physical address in response to determining to perform the first program operation, the first physical address corresponding to a storage region in which the first data is already programmed, the second physical address corresponding to a storage region in which the first data is to be re-programmed; and
a program buffer configured to store the first data in response to determining to perform the first program operation.

11. The storage device of claim 10, wherein, in response to the first program mode and the second program mode being different, the reference count/target program mode checker is configured to:
output a program determination signal to a processor, the program determination signal indicating that the first program operation is to be performed, and
output the first physical address and the first target storage region information to the program waiting list.

12. The storage device of claim 11, wherein, while the storage device enters an idle mode, or while the storage device performs a garbage collection operation, the first program operation is performed.

13. The storage device of claim 12, wherein, in response to a first request being received from the host device, and in response to a second request subsequent to the first request not being received from the host device from a time point at which the first request is received until a preset idle mode entry time is elapsed, the storage device enters the idle mode.

14. The storage device of claim 13, wherein, while the storage device enters the idle mode, the first data is retrieved from the storage region corresponding to the first physical address based on the program waiting list, the retrieved first data is stored in the program buffer, and it is checked whether the second request is received from the host device.

15. The storage device of claim 14, wherein, while the storage device enters the idle mode, the first program operation is performed on the first data stored in the program buffer after it is determined that the second request has not been received from the host device.

16. The storage device of claim 1, wherein the storage controller further includes:
a compression engine configured to generate compressed data by performing a data compression operation on original data corresponding to the program request based on a preset compression algorithm,
wherein the compressed data is stored in the nonvolatile memory device, and
wherein a storage region of the nonvolatile memory device in which the first data is stored by performing the first program operation is a saved storage region due to storing the compressed data in the nonvolatile memory device.

17. The storage device of claim 1, wherein the storage controller is configured to:
before the first program operation is performed, set at least one of a plurality of free blocks of the nonvolatile memory device as an open block, and
perform the first program operation on the open block.

18. A method of operating a storage device including a nonvolatile memory device, the method comprising:
in response to a program request being received from a host device, and in response to first data corresponding to the program request being already stored in the nonvolatile memory device, performing a deduplication operation in which the first data is logically programmed and not physically programmed;
in response to the program request or an erase request associated with the first data being received from the host device, updating a first reference count value from a first value to a second value, the first reference count value representing a number of times the first data is duplicated; and
in response to a determination based on information in a target program mode table that a first program mode corresponding to the first value and a second program mode corresponding to the second value are different, performing a first program operation in which the first data programmed with a first number of bits corresponding to the first program mode is re-programmed with a second number of bits corresponding to the second program mode,
wherein the target program mode table includes a relationship between reference count values and each of the first program mode, the second program mode and a third program mode, the first program mode corresponding to a case where the first value of the first reference count value is less than or equal to a first threshold, the third program mode corresponding to a case where a third value of the first reference count value is greater than or equal to a second threshold and the second program mode corresponding to a case where the second value of the first reference count value is between the first threshold and the second threshold.

19. The method of claim 18, wherein:

in response to the program request being received, and in response to the deduplication operation being performed on the first data, the first reference count value increases, in response to the second value being greater than the first value, and in response to the second program mode and the first program mode being different, the first program operation is performed, and the second number of bits is smaller than the first number of bits.

20. A storage device, comprising:

a nonvolatile memory device configured to store data based on program modes for programming data with a preset number of bits; and a storage controller including a target program mode table including a relationship between a reference count value and the program modes, the reference count value representing a number of times data is duplicated, the program modes including a first program mode, a second program mode and a third program mode, the first program mode corresponding to a case where a first value of a first reference count value is less than or equal to a first threshold, the third program mode corresponding to a case where a third value of the first reference count value is greater than or equal to a second threshold and the second program mode corresponding to a case where a second value of the first reference count value is between the first threshold and the second threshold, wherein the storage controller is configured to:

in response to a program request being received from a host device, and when first data corresponding to the program request is already stored in the nonvolatile memory device, perform a deduplication operation in which the first data is logically programmed and not physically programmed, in response to the program request or an erase request associated with the first data being received from the host device, update the first reference count value from the first value to the second value, the first reference count value representing a number of times the first data is duplicated, in response to determination based on information in the target program mode table that the first program mode corresponding to the first value and the second program mode corresponding to the second value are different, transmit a first command and a first address to the nonvolatile memory device such that a first program operation in which the first data programmed with a first number of bits corresponding to the first program mode is re-programmed with a second number of bits corresponding to the second program mode is performed, before the first program operation is performed, set at least one of a plurality of free blocks of the nonvolatile memory device as an open block, in response to the program request being received, and in response to the deduplication operation being performed on the first data, increase the first reference count value, and in response to the second value being greater than the first value, and when the second program mode and the first program mode are different, perform the first program operation on the open block.

* * * * *